US012797730B2

(12) United States Patent
Zhang

(10) Patent No.: US 12,797,730 B2
(45) Date of Patent: Nov. 17, 2026

(54) VIRTUAL SCENE INFORMATION PROCESSING METHOD, APPARATUS, DEVICE, STORAGE MEDIUM, AND PROGRAM PRODUCT

(71) Applicant: Tencent Technology (Shenzhen) Company Limited, Shenzhen (CN)

(72) Inventor: Luxin Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 180 days.

(21) Appl. No.: 18/744,520

(22) Filed: Jun. 14, 2024

(65) Prior Publication Data

US 2024/0335748 A1 Oct. 10, 2024

Related U.S. Application Data

(63) Continuation of application No. PCT/CN2023/095032, filed on May 18, 2023.

(30) Foreign Application Priority Data

Jul. 25, 2022 (CN) ........................ 202210911610.1

(51) Int. Cl.
*A63F 13/533* (2014.01)
*A63F 13/50* (2014.01)
(Continued)

(52) U.S. Cl.
CPC ............ *A63F 13/533* (2014.09); *A63F 13/50* (2014.09); *A63F 13/58* (2014.09); *A63F 13/60* (2014.09)

(58) Field of Classification Search
CPC ........ A63F 13/45; A63F 13/46; A63F 13/533; A63F 13/50; A63F 13/58; A63F 13/60; A63F 2300/303
See application file for complete search history.

(56) References Cited

U.S. PATENT DOCUMENTS

2010/0205567 A1* 8/2010 Haire ........................ G06F 8/38 715/840
2011/0191611 A1* 8/2011 boni ang gaw go ........................ G06F 3/04817 713/320

(Continued)

FOREIGN PATENT DOCUMENTS

CN 111813320 A 10/2020
CN 113641443 A 11/2021

(Continued)

OTHER PUBLICATIONS

Age of Empires 4—3v3 Awesome Teamwork | Multiplayer Gameplay. Dec 3, 2021. Screenshots taken from full video available at: https://www.youtube.com/watch?v=by_C-wf7kaE (Year: 2021).*

(Continued)

*Primary Examiner* — William J Allen
(74) *Attorney, Agent, or Firm* — Morgan, Lewis & Bockius LLP

(57) ABSTRACT

Embodiments of this application provide a virtual scene information processing method performed by an electronic device. The method includes: displaying a virtual scene, the virtual scene including a first virtual object; displaying, in response to an interaction process including the first virtual object ending, an information summary interface configured to summarize the interaction process, and displaying a plurality of tab controls in the information summary interface, each tab control corresponding to one information summary dimension; and in response to a selection of a first tab control among the plurality of tab controls, displaying at least one piece of summary information corresponding to the first tab control in an information display region of the information summary interface other than the plurality of tab controls.

20 Claims, 11 Drawing Sheets

(51) Int. Cl.
*A63F 13/58* (2014.01)
*A63F 13/60* (2014.01)

(56) References Cited

U.S. PATENT DOCUMENTS

| | | | | |
|---|---|---|---|---|
| 2013/0117110 | A1* | 5/2013 | Wu | H04L 67/02 705/14.54 |
| 2016/0271499 | A1* | 9/2016 | Higo | A63F 13/822 |
| 2017/0001112 | A1* | 1/2017 | Gilmore | A63F 13/49 |
| 2017/0060349 | A1 | 3/2017 | Munoz et al. | |
| 2017/0337776 | A1* | 11/2017 | Herring | A63F 13/79 |
| 2021/0031113 | A1* | 2/2021 | Ohtani | A63F 13/822 |
| 2022/0092133 | A1 | 3/2022 | Devereux et al. | |

FOREIGN PATENT DOCUMENTS

| | | | |
|---|---|---|---|
| CN | 113721804 | A | 11/2021 |
| CN | 113901313 | A | 1/2022 |

OTHER PUBLICATIONS

"Help with minimum game requirements AoE 4". Jun. 21, 2021. https://forums.ageofempires.com/t/help-with-minimum-game-requirements-aoe-4/134785 (Year: 2021).*
Age of Empires 4 System Requirements. Jul. 19, 2021. Recovered from www.archive.org https://web.archive.org/web/20210719202734/https://www.systemrequirementslab.com/cyri/requirements/age-of-empires-4/16657#google_vignette (Year: 2021).*
Age of Empires 3 Definitive Edition—1vs1 Exteme AI. Oct. 24, 2020. Screenshots taken from full video available at: https://www.youtube.com/watch?v=xXNuXnChgTk (Year: 2021).*
Reference UU: Age of Empires III System Requirements. Jan. 28, 2021. Recovered from www.archive.org https://web.archive.org/web/20210128000137/https://www.systemrequirementslab.com/cyri/requirements/age-of-empires-iii/10370 (Year: 2021).*
K. Graham et al., "Cyberspace Odyssey: A Competitive Team-Oriented Serious Game in Computer Networking," in IEEE Transactions on Learning Technologies, vol. 13, No. 3, pp. 502-515, 1 July-Sep. 2020, doi: 10.1109/TLT.2020.3008607. (Year: 202 ).*
Tencent Technology, ISR, PCT/CN2023/095032, Sep. 1, 2023, 2 pgs.
Tencent Technology, Korean Office Action, KR Patent Application No. 10-2024-7028225, Nov. 12, 2025, 9 pgs.
YouTube.com, TaHisHeRe, "World of Tanks", Fast Game, Fat Result! | World of Tanks, Jan. 2020, Retrieved from the Internet: https://www.youtube.com/watch?v=Mze9WNpp89E.
Tencent Technology, WO, PCT/CN2023/095032, Dec. 5, 2024, 4 pgs.
Tencent Technology, IPRP, PCT/CN2023/095032, Jan. 28, 2025, 5 pgs.
Tencent Technology, Japanese Office Action, JP Patent Application No. 2024-532400, Feb. 18, 2025, 7 pgs.
Pvp.qq.com, "Settlement System Algorithm and Display Optimization", King of Glory Operations Team, May 2019, Retrieved from the Internet: https://pvp.qq.com/web201706/newsdetail.shtml?tid=431271.
Sysgeek.Cn, "How to Enable and Disable Chrome Tab Thumbnail Previews", Mar. 2021, Retrieved from the Internet: https://www.sysgeek.cn/chromes-tab-image-preview/.

* cited by examiner

VIRTUAL SCENE INFORMATION PROCESSING METHOD, APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2023/095032, entitled "VIRTUAL SCENE INFORMATION PROCESSING METHOD, APPARATUS, DEVICE, STORAGE MEDIUM, AND PROGRAM PRODUCT" filed on May 18, 2023, which is based upon and claims priority to Chinese Patent Application No. 202210911610.1, entitled "VIRTUAL SCENE INFORMATION PROCESSING METHOD, APPARATUS, DEVICE, STORAGE MEDIUM, AND PROGRAM PRODUCT" filed on Jul. 25, 2022, both of which are incorporated herein by reference in their entirety.

FIELD OF THE TECHNOLOGY

This application relates to the field of computer human-computer interaction technologies, and in particular, to a virtual scene information processing method, an apparatus, a device, a storage medium, and a program product.

BACKGROUND OF THE DISCLOSURE

The human-computer interaction technology of a virtual scene based on graphics processing hardware can achieve diversified interactions between virtual objects controlled by users or artificial intelligence according to actual application requirements and has wide practical value. For example, in a virtual scene such as a game, a real battle process between the virtual objects can be simulated.

Using the virtual scene as a game as an example, after a game match ends, a match settlement interface is displayed. Various summary data related to the match is displayed on the match settlement interface to help the users understand.

In related art, various summary data is totally displayed on a settlement interface, which inevitably leads to high jitter in a rate of resource occupancy of a backend server of the virtual scene. However, resources of the backend server are limited. As a result, the stability of matches that is still running and to-be-run matches is affected. For example, lost frames and disconnection may occur.

SUMMARY

Embodiments of this application provide a virtual scene information processing method, an apparatus, an electronic device, a computer-readable storage medium, and a computer program product, to achieve efficient communication of summary information of a virtual scene while the stability of the operation of the virtual scene is ensured.

Technical solutions in embodiments of this application are implemented as follows:

An embodiment of this application provides a virtual scene information processing method, performed by an electronic device, the method including:

- displaying a virtual scene, the virtual scene including a first virtual object;
- in response to an interaction process including the first virtual object ending, displaying an information summary interface configured to summarize the interaction process, and displaying a plurality of tab controls in the information summary interface, each tab control corresponding to one information summary dimension; and
- in response to a selection of a first tab control among the plurality of tab controls, displaying at least one piece of summary information corresponding to the first tab control in an information display region of the information summary interface other than the plurality of tab controls.

An embodiment of this application provides an electronic device, including:

- a memory, configured to store executable instructions; and
- a processor, configured to implement, when executing the executable instructions stored in the memory, the virtual scene information processing method in embodiments of this application.

An embodiment of this application provides a non-transitory computer-readable storage medium, having executable instructions stored thereon, the executable instructions, when executed by a processor of an electronic device, causing the electronic device to implement the virtual scene information processing method in embodiments of this application.

Embodiments of this application have the following beneficial effects:

The summary information in the virtual scene is divided into different dimensions, and switching and displaying of the summary information in different information summary dimensions are implemented by using the tab control, so that a user can trigger a tab control of a corresponding dimension according to requirements to display what the user needs to, resource consumption of information transmission between the electronic device and a backend server is reduced, and information display of the virtual scene is enriched without occupying excessively resources, thereby ensuring the stability of the virtual scene operation and improving efficiency of conveying summary information in the virtual scene. Therefore, the user experience is improved.

DESCRIPTION OF EMBODIMENTS

Figure 1A:
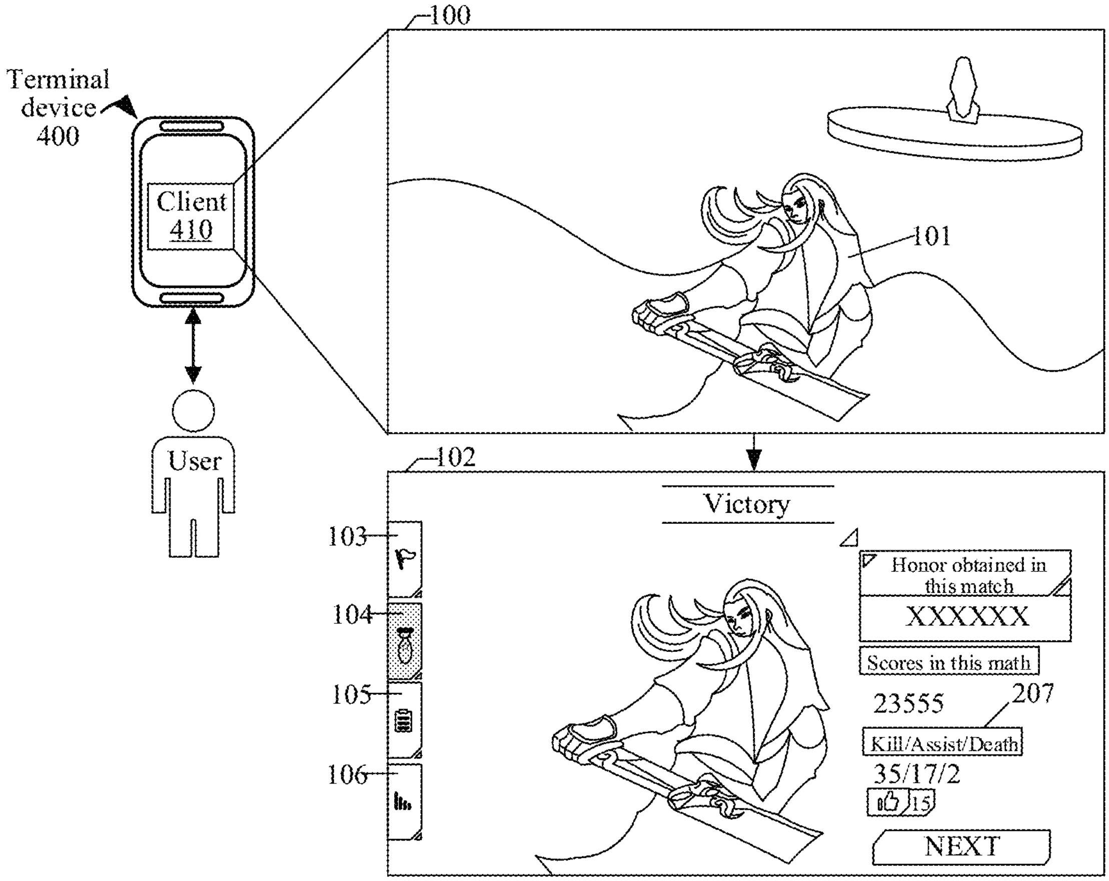
FIG. 1A is a schematic diagram of an application mode of a virtual scene information processing method according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but "some embodiments" may be the same subset or different subsets of all the possible embodiments, and can be combined with each other without conflict.

In embodiments of this application, data related to user information (such as an account of a user) and the like is involved. When embodiments of this application are applied to specific products or technologies, user permission or consent needs to be obtained, and collection, use, and processing of related data need to comply with relevant laws, regulations and standards of relevant countries and regions.

In the following description, the terms "first", "second", and the like are merely intended to distinguish between similar objects rather than describe specific orders. The terms "first", "second", and the like may, where permitted, be interchangeable in a particular order or sequence, so that embodiments of this application described herein may be performed in an order other than that illustrated or described herein.

When embodiments of this application are applied to specific products or technologies, the data collection, use, and processing processes related to virtual scenes are to comply with laws and regulations of countries. Before data from relevant applications is collected, the information processing rules are to be informed, and a target object is to be solicited agreement separately. In addition, facial information is processed in strict compliance with legal and regulatory requirements and personal information processing rules, and security of relevant data is ensured by using technical measures.

Unless otherwise defined, meanings of all technical and scientific terms used in this specification are the same as those usually understood by a person skilled in the art to which this application belongs. Terms used in the specification are merely intended to describe objectives of embodiments of this application, but are not intended to limit this application.

Before embodiments of this application are further described in detail, a description is made on terms involved in embodiments of this application, and the terms in embodiments of this application are applicable to the following explanations.

(1) In response to: It is configured for representing a condition or a status on which an executed operation depends. In a case that the dependent condition or status is satisfied, the executed one or more operations may be real-time or have a set delay. There is no limit to a sequence on the plurality of executed operations unless otherwise specified.

(2) Virtual scene: It is a scene displayed (or provided) when an application is run on a terminal device. The scene may be a simulated environment of the real world, a semi-simulated and semi-fictional environment, or a completely fictional environment. The virtual scene may be any one of a two-dimensional virtual scene, a two-and-a-half-dimensional virtual scene, or a three-dimensional virtual scene. A dimension of the virtual scene is not limited in embodiments of this application. For example, the virtual scene may include sky, land, sea, and the like. The land may include environmental elements such as a desert and a city. A user may control movement of a virtual object in the virtual scene.

(3) Virtual object: It is an image of various people and articles that can be interacted with in a virtual scene, or an active object in a virtual scene. The active object may be a virtual character, a virtual animal, an anime character, and the like, such as a person and an animal displayed in the virtual scene. The virtual object may be a virtual figure that is in the virtual scene and that is configured for representing a user. The virtual scene may include a plurality of virtual objects, and each virtual object has a shape and a volume in the virtual scene and occupies a part of space in the virtual scene.

(4) Virtual item: It is an item including a throwing item, a shooting item, and the like, where the throwing item is thrown to hit a target object in a virtual scene, and the shooting item hits a target object in a virtual scene by launching at least one projectile.

(5) Scene data: It is feature data representing a virtual scene, for example, may be an area of a constructed area in the virtual scene, an architectural style of the virtual scene currently located, and the like, and may also include a location of a virtual building in the virtual scene, a floor area of the virtual building, and the like.

(6) Tab control: It is also referred to as a tag control and a control arranged in rows or columns in a human-computer interaction interface. Levels of a plurality of tab controls can be parallel or progressive. For example, the tab control may be a switch button or a jump button configured to implement switching/jumping between different summary information dimensions of a virtual scene.

(7) Information summary dimension: It is a dimension that summarizes information related to an interaction process in a virtual scene, such as a virtual item, a virtual object, and a login account of a virtual scene.

(8) Summary information: It is information describing a virtual scene in an information summary dimension, such as an attribute and price of a virtual item, a quantity of maps and scenarios in the virtual scene, and a quantity of deaths and assists of a virtual object.

(9) Client: It is an application, such as a video playback client or a game client, running in a terminal device for providing various services.

Embodiments of this application provide a virtual scene information processing method, an apparatus, an electronic device, a computer-readable storage medium, and a computer program product, to achieve efficient communication of summary information of a virtual scene while the stability of the operation of the virtual scene is ensured. For ease of understanding the virtual scene information processing method in embodiments of this application, an exemplary implementation scenario of the virtual scene information processing method in embodiments of this application is first described. A virtual scene in the virtual scene information processing method in embodiments of this application can be outputted completely based on the terminal device, or outputted collaboratively based on the terminal device and a server.

In some embodiments, the virtual scene may alternatively be an environment for virtual objects (such as game characters) to interact, for example, may be an environment for the game characters to fight in the virtual scene. By controlling actions of the game characters, both parties can interact in the virtual scene.

In an implementation scenario, FIG. 1A is a schematic diagram of an application mode of a virtual scene information processing method according to an embodiment of this application, which is applicable for some application modes, such as console version/offline mode games, that relevant data calculation of a virtual scene 100 can be completed completely depending on a computing capability of graphics processing hardware of a terminal device 400. Output of the virtual scene is completed through different types of terminal devices 400 such as a smartphone, a tablet computer, and a virtual reality/augmented reality device.

As an example, a type of the graphics processing hardware includes a central processing unit (CPU) and a graphics processing unit (GPU).

When visual perception of the virtual scene 100 is formed, the terminal device 400 calculates data required for display through graphics calculation hardware and completes loading, parsing, and rendering of display data. Graphics output hardware outputs video frames that can form the visual perception of the virtual scene. For example, a two-dimensional video frame is presented on a display screen of a smartphone, or a video frame for achieving a three-dimensional display effect is projected on lenses of augmented reality/virtual reality glasses. In addition, to enrich perception channels, the terminal device 400 may further use different hardware to form one or more of auditory perception, tactile perception, motion perception, and taste perception.

As an example, a client 410 (such as a console version of a game application) is run on the terminal device 400. During a running process of the client 410, a virtual scene including role-playing is output. The virtual scene may be an environment for game characters to interact, for example, may be a plain, a street, a valley, or the like for the game characters to fight. An example in which the virtual scene 100 is displayed in a third-person viewing angle is used. A first virtual object 101 is displayed in the virtual scene 100. The first virtual object 101 may be a game character controlled by a user. In other words, the first virtual object 101 is controlled by a real user and may move in the virtual scene 100 in response to an operation of the real user on a controller (such as a touch screen, a voice-activated switch, a keyboard, a mouse, or a joystick). For example, when the real user moves the joystick to the right, the first virtual object 101 may move to the right in the virtual scene 100 or keep stationary, jump, and control the first virtual object 101 to perform a shooting operation, and the like.

For example, the client 410 displays, in response to an interaction process in which the first virtual object 101 participates in the virtual scene 100 ending, an information summary interface 102 corresponding to the first virtual object 101. A plurality of tab controls are displayed in the information summary interface 102 (where each tab control corresponds to one information summary dimension in the virtual scene 100), for example, including a tab control 103 (corresponding to summary information of another virtual object in a camp to which the first virtual object 101 in the virtual scene 100 belongs), a tab control 104 (corresponding to summary information of the first virtual object 101), a tab control 105 (corresponding to summary information of a virtual object included in an opposing camp of the camp to which the first virtual object 101 belongs in the virtual scene 100), and a tab control 106 (corresponding to summary information of virtual items used in this match in the virtual scene 100). Then, the client 410 displays, in an information display region of the information summary interface 102 other than the plurality of tab controls, at least one piece of summary information, such as interactive record data 107 (including a quantity of kills, assists, and deaths) of the first virtual object 101 in this match, in a first information summary dimension in response to a first tab control (such as the tab control 104) among the plurality of tab controls being selected (where the tab control 104 may be selected by default or may be selected in response to a trigger operation of a player). In this way, switching of summary information in different information summary dimensions in the virtual scene is implemented by using the tab control, so that efficiency of conveying summary information in the virtual scene is improved.

The client 410 may further display a model of the first virtual object 101 in the information summary interface 102. In this way, the user can intuitively associate a first account logged in to the information summary interface 102 with the first virtual object 101 by observing the model of the first virtual object 101, so that the information conveying efficiency of conveying the summary information in the virtual scene to the user is further improved.

Figure 1B:
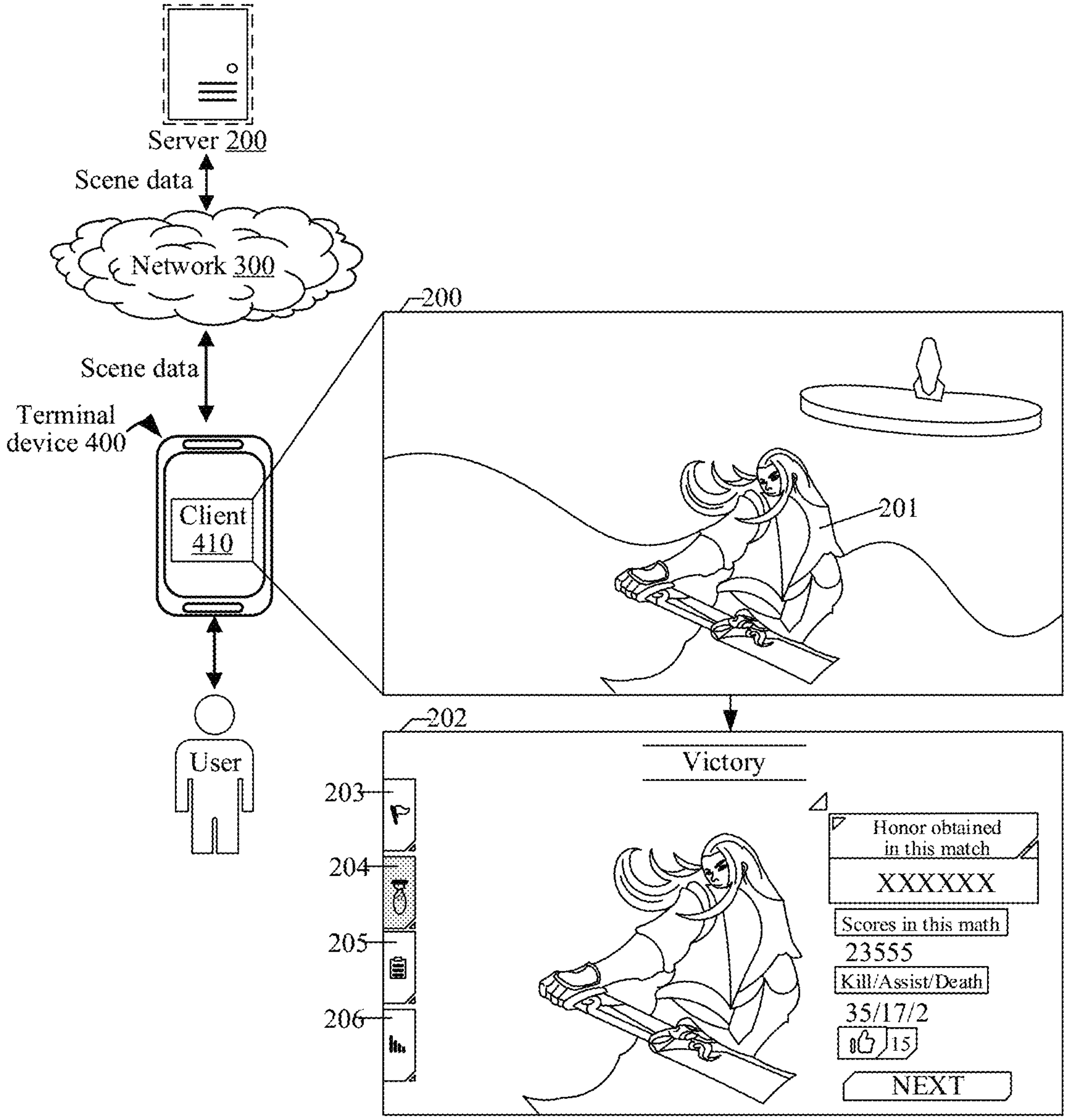
FIG. 1B is a schematic diagram of an application mode of a virtual scene information processing method according to an embodiment of this application.

In another implementation scenario, FIG. 1B is a schematic diagram of an application mode of a virtual scene information processing method according to an embodiment of this application, which is applied to the terminal device 400 and a server 200, and applicable for an application mode that depends on a computing capability of the server 200 to complete virtual scene calculation and outputs a virtual scene by using the terminal device 400.

An example in which visual perception of a virtual scene 200 is formed is used. The server 200 calculates display data (such as scene data) related to the virtual scene and transmits the display data to the terminal device 400 over a network 300. The terminal device 400 depends on graphics computing hardware to complete loading, parsing, and rendering of calculation of display data and depends on graphics output hardware to output the virtual scene to form visual perception. For example, a two-dimensional video frame may be presented on a display screen of a smartphone, or a video frame for achieving a three-dimensional display effect may be projected on lenses of augmented reality/virtual reality glasses. For perception of a form of the virtual scene, corresponding hardware output of the terminal device 400 may be used, such as using a microphone to form auditory perception and using a vibrator to form tactile perception.

As an example, a client 410 (such as a console version of a game application) is run on the terminal device 400 and is connected to the server 200 (such as a game server) to interact with another user in a game. The terminal device 400 outputs the virtual scene 200 of the client 410. An example in which the virtual scene 200 is displayed in a third-person viewing angle is used. A first virtual object 201 is displayed in the virtual scene 200. The first virtual object 201 may be a game character controlled by a user. In other words, the first virtual object 201 is controlled by a real user and may move in the virtual scene 200 in response to an operation of the real user on a controller (such as a touch screen, a voice-activated switch, a keyboard, a mouse, or a joystick). For example, when the real user moves the joystick to the right, the first virtual object 201 may move to the right in the virtual scene 200 or keep stationary, jump, and control the first virtual object 201 to perform a shooting operation, and the like.

For example, the client 410 displays, in response to an interaction process in which the first virtual object 201 participates in the virtual scene 200 ending, an information summary interface 202 corresponding to the first virtual object 201. A plurality of tab controls are displayed in the information summary interface 202 (where each tab control corresponds to one information summary dimension in the virtual scene 200), for example, including a tab control 203 (corresponding to summary information of another virtual object in a camp to which the first virtual object 201 in the virtual scene 200 belongs), a tab control 204 (corresponding to summary information of the first virtual object 201), a tab control 205 (corresponding to summary information of a virtual object included in an opposing camp of the camp to which the first virtual object 201 belongs in the virtual scene 200), and a tab control 206 (corresponding to summary information of virtual items used in this match in the virtual scene 200). Then, the client 410 displays, in an information display region of an information summary interface 202 other than the plurality of tab controls, at least one piece of summary information, such as interactive record data 207 (including a quantity of kills, assists, and deaths) of the first virtual object 201 in this match, in a first information summary dimension in response to a first tab control (such as a tab control 204) among the plurality of tab controls being selected (where the tab control 204 may be selected by default or may be selected in response to a trigger operation of a player). In this way, switching of summary information in different information summary dimensions in the virtual scene is implemented by using the tab control, so that resource consumption of information transmission between the terminal device and a backend server is reduced, thereby ensuring the stability of the operation of the virtual scene. In addition, efficiency of conveying summary information in the virtual scene is improved.

In some embodiments, the terminal device 400 may alternatively implement the virtual scene information processing method provided in this embodiment of this application by running a computer program. For example, the computer program may be a native program or a software module in an operating system; may be a native application (APP), that is, a program, such as a shooting game APP (that is the client 410), that needs to be installed in the operating system to run; may be a mini program, that is, a program that only needs to be downloaded into a browser environment to run; or may be a game mini program that can be embedded in any APP. In conclusion, the foregoing computer program may be any form of application program, module, or plug-in.

An example in which the computer program is an application is used. In an actual implementation, an application that supports a virtual scene is installed in and run on the terminal device 400. The application may be any one of a first-person shooting game (FPS), a third-person shooting game, a virtual reality application, a three-dimensional map program, or a multiplayer gunfight survival game. The user uses the terminal device 400 to operate a virtual character in the virtual scene to carry out an activity. The activity includes but is not limited to at least one of adjusting a body posture, crawling, walking, running, riding, jumping, driving, picking up, shooting, attacking, throwing, or constructing a virtual building. For example, the virtual character may be a virtual character, such as a simulation character or an animation character.

In some other embodiments, embodiments of this application may alternatively be implemented with help of a cloud technology. The cloud technology is a hosting technology that integrates resources such as hardware, software, and networks in a wide area network or a local area network, to implement computing, storage, processing, and sharing of data.

The cloud technology is a general term of network technologies, information technologies, integration technologies, management platform technologies, application technologies, and the like, applied to a cloud computing business model, and may form a resource pool to satisfy what is needed in a flexible and convenient manner. A cloud computing technology may be an important support. A large amount of computing resources and storage resources are needed for background services in a technical network system.

For example, the server 200 shown in FIG. 1B may be an independent physical server, a server cluster or distributed system composed of a plurality of physical servers, or a cloud server providing basic cloud computing services, such as cloud services, cloud databases, cloud computing, cloud functions, network services, cloud communications, middleware services, domain name services, security services, content delivery networks (CDNs), and big data and artificial intelligence platforms. The terminal device 400 may be a smartphone, a tablet computer, a notebook computer, a desktop computer, a smart speaker, a smartwatch, a vehicle-mounted terminal, or the like, but is not limited thereto. The terminal device 400 and the server 200 may be connected directly or indirectly in a wired or wireless communication manner. This is not limited in embodiments of this application.

Figure 2:
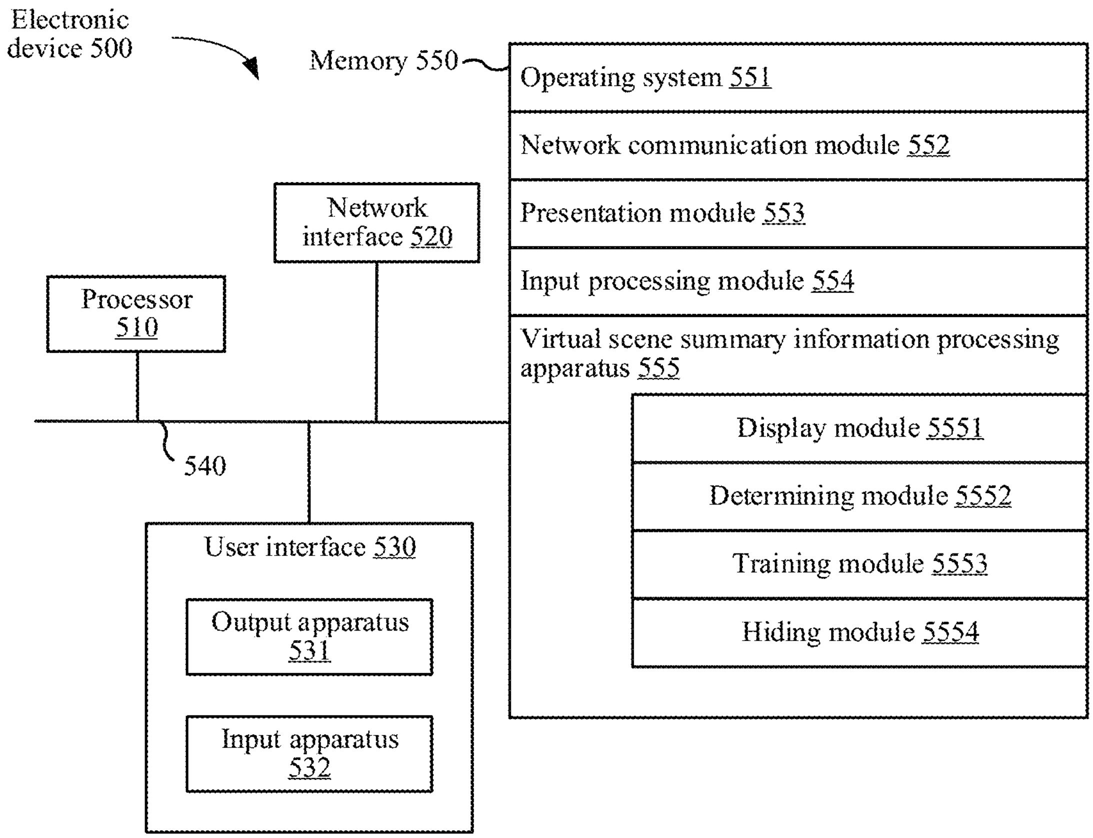
FIG. 2 is a schematic diagram of a structure of an electronic device according to an embodiment of this application.

A structure of an electronic device in this embodiment of this application is described below. An example in which the electronic device is a terminal device is used. FIG. 2 is a schematic diagram of a structure of an electronic device 500 according to an embodiment of this application. The electronic device 500 shown in FIG. 2 includes at least one processor 510, a memory 550, at least one network interface 520, and a user interface 530. Components in the electronic device 500 are coupled together via a bus system 540. The bus system 540 is configured to implement connection and communication between the components. In addition to a data bus, the bus system 540 further includes a power bus, a control bus, and a state signal bus. However, for case of clear description, various buses are marked as the bus system 540 in FIG. 2.

The processor 510 may be an integrated circuit chip with a signal processing capability, such as a general-purpose processor, a digital signal processor (DSP), or another programmable logic device, a discrete gate or a transistor logic device, or discrete hardware component. The general-purpose processor may be a microprocessor, any conventional processor, or the like.

The user interface 530 includes one or more output apparatuses 531 that present media content, including one or more speakers and/or one or more visual display screens. The user interface 530 further includes one or more input apparatuses 532 including user interface members that help user input, such as a keyboard, a mouse, a microphone, a touch display screen, a camera, other input buttons and controls.

The memory 550 may be removable, non-removable, or a combination thereof. For example, a hardware device includes a solid-state memory, a hard disk drive, an optical drive, and the like. The memory 550 includes one or more storage devices physically away from the processor 510.

The memory 550 includes a volatile memory or a non-volatile memory, or may include both a volatile memory and a non-volatile memory. The non-volatile memory may be a read only memory (ROM), and the volatile memory may be a random access memory (RAM). The memory 550 described in this embodiment of this application is intended to include any suitable types of memories.

In some embodiments, the memory 550 can store data to support various operations, examples of the data include a program, a module, and a data structure, or a subset or superset thereof, which are described below by using examples.

An operating system 551 includes system programs for processing various basic system services and performing hardware-related tasks, for example, a frame layer, a core library layer, and a drive layer, and is used for implementing various basic services and processing hardware-based tasks.

A network communication module 552 is configured to reach another computing device via one or more (which are wired or wireless) network interfaces 520. An example network interface 520 includes: Bluetooth, wireless fidelity (Wi-Fi), a universal serial bus (USB), and the like.

A presentation module 553 is configured to enable presentation of information via one or more output apparatuses 531 (for example, display screens and speakers) associated with the user interface 530 (for example, a user interface for operating a peripheral device and displaying content and information).

An input processing module 554 is configured to detect one or more user enters or interactions from one or more input apparatuses 532 and translate the detected inputs or interactions.

In some embodiments, an apparatus in this embodiment of this application may be implemented in a software manner. FIG. 2 shows a virtual scene summary information processing apparatus 555 stored in the memory 550. The apparatus 555 may be software in the form of a program and a plug-in, and includes the following software modules: a display module 5551, a determining module 5552, a training module 5553, and a hiding module 5554. These modules are logical modules, and therefore may be randomly combined or further divided based on a function to be implemented. In FIG. 2, all the above-mentioned modules are shown at a time for convenience of expression, but it is not to be considered that the virtual scene summary information processing apparatus 555 excludes the implementation that can only include the display module 5551. Functions of each module are described below.

The virtual scene information processing method in this embodiment of this application is described below in detail with reference to the accompanying drawings. The virtual scene information processing method in this embodiment of this application may be performed by the terminal device 400 in FIG. 1A alone or may be performed by the terminal device 400 and the server 200 in FIG. 1B jointly.

Figure 3:
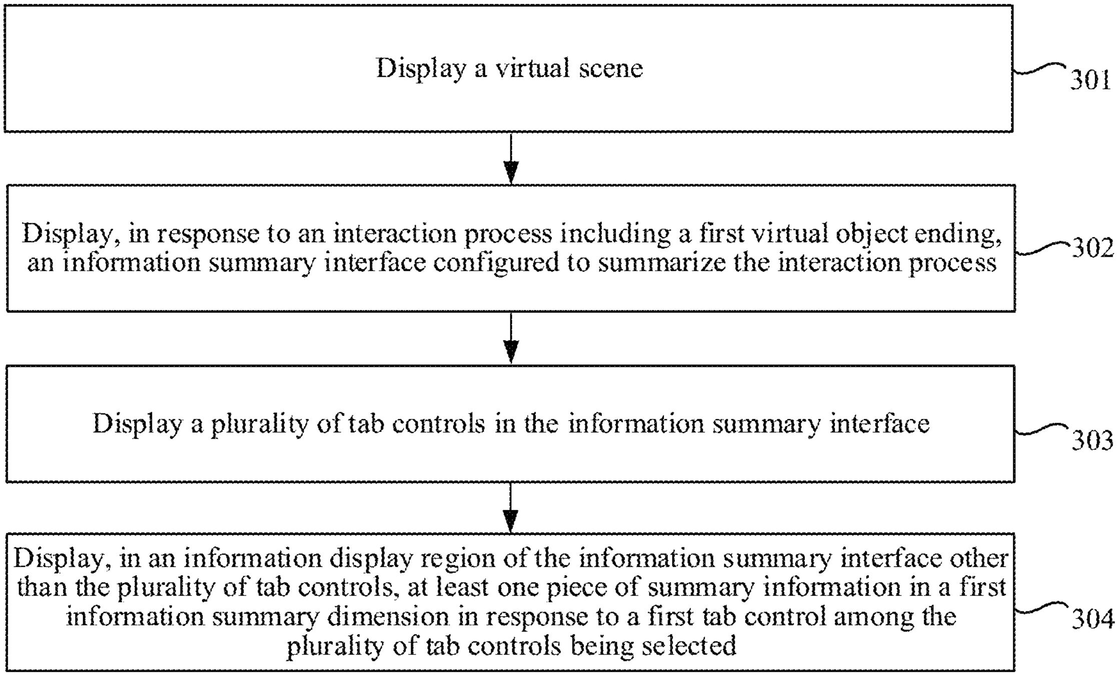
FIG. 3 is a schematic flowchart of a virtual scene information processing method according to an embodiment of this application.

An example in which the virtual scene information processing method in this embodiment of this application is performed by the terminal device 400 in FIG. 1A alone is used in the following for description. FIG. 3 is a schematic flowchart of a virtual scene information processing method according to an embodiment of this application, which is described with reference to operations shown in FIG. 3.

The method shown in FIG. 3 may be performed by various forms of computer programs running on the terminal device 400 but is not limited to being performed by the foregoing client 410, or may be performed by the foregoing operating system 551, software module, or script. Therefore, the client is not to be regarded as a limitation of this embodiment of this application.

Operation 301: Display a virtual scene.

The virtual scene includes a first virtual object herein.

In some embodiments, a human-computer interaction interface of the client may display a virtual scene from a first-person view (for example, using a player's view to play a first virtual object in a game); may display a virtual scene from a third-person view (for example, a player chases a first virtual object in a game to play the game); or may display a virtual scene from a bird's-eye view. The foregoing views may be switched flexibly based on instructions of a user.

As an example, the first virtual object may be an object controlled by a user in the game. Certainly, the virtual scene may further include other virtual objects that may be controlled by other users or by a robot program. The first virtual object may be assigned to any one of a plurality of teams. The teams may have an opposing relationship or a collaborative relationship. The teams in the virtual scene may include one or all of the above relationships.

An example in which the virtual scene is displayed from the first-person view is used. A virtual scene displayed in the human-computer interaction interface may include: determining a field of view area of the first virtual object based on a viewing position and a field of view of the first virtual object in a complete virtual scene, and presenting a part of virtual scene located in the field of view area in the complete virtual scene. In other words, the displayed virtual scene may be a part of virtual scene relative to a panoramic virtual scene. Because the first-person view is the most impactful viewing angle for a user, immersive perception for the user can be achieved during an operation.

An example in which the virtual scene is displayed from the bird's-eye view is used. A virtual scene displayed in the human-computer interaction interface may include: presenting, in response to a zoom operation for a panoramic virtual scene, a part of the virtual scene corresponding to the zoom operation in the human-computer interaction interface. In other words, the displayed virtual scene may be a part of virtual scene relative to the panoramic virtual scene. In this way, operability of the user during an operation can be improved, thereby improving efficiency of human-computer interaction.

Operation 302: Display, in response to an interaction process including the first virtual object ending, an information summary interface configured to summarize the interaction process.

In some embodiments, an interaction interface of the virtual scene may be replaced, in response to the interaction process including the first virtual object ending, with the information summary interface configured to summarize the interaction process. Certainly, the human-computer interaction interface of the client may alternatively be divided into two regions in advance. One region is configured to display an interaction interface of the virtual scene, and the other region is configured to summarize the information summary interface of the interaction process.

For example, an example in which the first virtual object is a virtual object A controlled by a user 1 is used. Before displaying the interaction interface of the virtual scene and an information summary interface corresponding to the virtual object A in the human-computer interaction interface, the client may first measure a size of a display screen and display the interaction interface and the information summary interface by using a corresponding display manner. For example, when it is detected that the size of the display screen is smaller than a size threshold (for example, the size threshold may be a diagonal length of a screen of a smartphone), after an interaction process in which the virtual object A controlled by the user 1 participates in the virtual scene ends, the interaction interface of the virtual scene may be replaced with the information summary interface corresponding to the virtual object A. When the size of the display screen is larger than the size threshold, the interaction interface of the virtual scene and the information summary interface corresponding to the virtual object A may be displayed separately in a split-screen manner. In this way, different display manners are used for terminal devices with different sizes, and personalized requirements of different users can be satisfied.

Operation 303: Display a plurality of tab controls in the information summary interface.

The plurality of tab controls may be displayed side by side or dispersed in the information summary interface. Each tab control corresponds to one information summary dimension in the virtual scene. The information summary dimension may include a virtual item, a virtual object, a camp in the virtual scene, an account located in the virtual scene, and the like. It is assumed that there are four tab controls displayed in the information summary interface, respectively corresponding to summary information of virtual items in the virtual scene (such as a quantity of times each virtual item is used and an amount of damage caused by the virtual item), the summary information of the first virtual object (such as a quantity of kills, deaths, assists, and likes by other users of the first virtual object), summary information of other objects included in a camp to which the first virtual object belongs (such as a quantity of kills and deaths of other virtual objects in the same camp), and summary information of virtual objects included in an opposing camp of the camp to which the first virtual object belongs (such as a quantity of kills and deaths of each virtual object in the opposing camp).

In some embodiments, when the plurality of tab controls are displayed side by side in the information summary interface, the client may implement operation 303 in the following manner: displaying the plurality of tab controls in the information summary interface in a specific sorting manner, the sorting manner including: sorting historical interaction frequencies respectively corresponding to the plurality of tab controls in descending order (for example, it is assumed that the plurality of tab controls are four tab controls, namely a tab control 1 to a tab control 4, where a quantity of times the tab control 1 is selected in the past week is 5, a quantity of times the tab control 2 is selected in the past week is 2, a quantity of times the tab control 3 is selected in the past week is 6, and a quantity of times the tab control 4 is selected in the past week is 4; then the sorting manner of the four tab controls in the information summary interface is: the tab control 3, the tab control 1, the tab control 4, and the tab control 2; and in this way, the sorting manner of the plurality of tab controls is suitable for the user's usage habits, so that it is convenient for the user to view); sorting an amount of information in the information summary dimensions respectively corresponding to the plurality of tab controls in descending order (for example, it is assumed that the plurality of tab controls are four tab controls, namely a tab control 1 to a tab control 4, where an information summary dimension corresponding to the tab control 1 includes 10 pieces of summary information, an information summary dimension corresponding to the tab control 2 includes 20 pieces of summary information, an information summary dimension corresponding to the tab control 3 includes five pieces of summary information, and an information summary dimension corresponding to the tab control 4 includes 15 pieces of summary information; then the sorting manner of the four tab controls in the information summary interface is: the tab control 2, the tab control 4, the tab control 1, and the tab control 3); sorting timeliness parameters (for example, the timeliness of the information summary dimension may be represented by a reciprocal of a sum of generated duration of all summary information in an information summary dimension) of information summary dimensions respectively corresponding to the plurality of tab controls in descending order (for example, it is assumed that the plurality of tab controls are four tab controls, namely a tab control 1 to a tab control 4, where a timeliness parameter corresponding to the tab control 1 is 0.01, a timeliness parameter corresponding to the tab control 2 is 0.04, a timeliness parameter corresponding to the tab control 3 is 0.06, and a timeliness parameter corresponding to the tab control 4 is 0.03; then the sorting manner of the four tab controls in the information summary interface is: the tab control 3, the tab control 2, the tab control 4, and the tab control 1; and in this way, it is convenient for the user to view the latest summary information generated in the virtual scene); and sorting importance indicators (for example, importance of an information summary dimension may be represented by a sum of degrees of similarity between summary information in the information summary dimension and a feature of the first virtual object) of information summary dimensions respectively corresponding to the plurality of tab controls in descending order (for example, it is assumed that the plurality of tab controls are four tab controls, namely a tab control 1 to a tab control 4, where an importance indicator corresponding to the tab control 1 is 3, an importance indicator corresponding to the tab control 2 is 2, an importance indicator corresponding to the tab control 3 is 1, and an importance indicator corresponding to the tab control 4 is 4; then the sorting manner of the four tab controls in the information summary interface is: the tab control 4, the tab control 1, the tab control 2, and the tab control 3; and in this way, it is convenient for the user to first view the most important summary information in the virtual scene, so that user's viewing experience is improved).

Figure 4A:
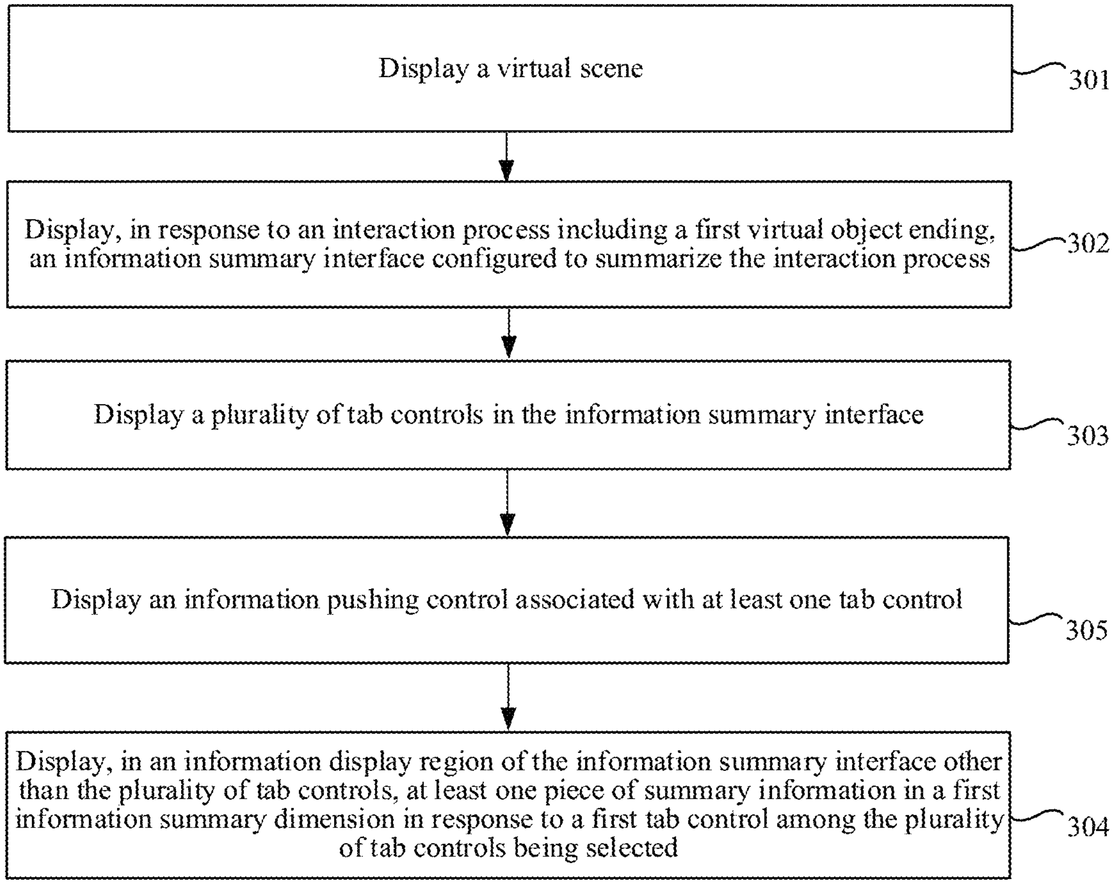
FIG. 4A and FIG. 4B are schematic flowcharts of a virtual scene information processing method according to an embodiment of this application.

In some other embodiments, FIG. 4A is a schematic flowchart of a virtual scene information processing method according to an embodiment of this application. As shown in FIG. 4A, after operation 303 shown in FIG. 3 is performed, operation 305 shown in FIG. 4A is alternatively performed. A description is carried out with reference to operations shown in FIG. 4A.

Operation 305: Display an information pushing control associated with at least one tab control.

The information pushing control here is configured to display at least one piece of summary information in an associated information summary dimension. The associated information summary dimension is an information summary dimension corresponding to an associated tab control. The associated tab control is the tab control associated with the information pushing control.

In some embodiments, when a quantity of tab controls is one, the client may implement operation 305 by using the following manner: displaying, in response to a tab control selection operation, an information pushing control associated with a selected tab control.

For example, an example in which a quantity of the plurality of tab controls is four, namely a tab control 1 to a tab control 4 is used. The client displays, in response to a selection operation triggered by the user for the four tab controls, an information pushing control associated with the selected tab control. For example, assuming that the user selects the tab control 2 among the four tab controls, an information pushing control associated with the tab control 2 may be displayed. In this way, the user can intuitively view important summary information in an information summary dimension corresponding to the tab control 2, thereby improving efficiency of conveying information.

In some other embodiments, the client may alternatively implement operation 305 by using the following manner: displaying an information pushing control associated with a tab control satisfying a push condition, the push condition including at least one of the following: obtaining, in the information summary dimension corresponding to the tab control, new summary information transmitted by a server (to be specific, once the new summary information transmitted by the server is obtained in a specific information summary dimension, the new summary information is pushed); obtaining, in the information summary dimension corresponding to the tab control, summary information of which a similarity parameter (for example, a degree of similarity between each piece of summary information in the information summary dimension and a feature of the first virtual object) is greater than or equal to a similarity threshold; or obtaining, in the information summary dimension corresponding to the tab control, summary information (for example, an account of which interaction data in this match is greater than an interaction data threshold (that is, another high-level player) may be pushed to the user, for example, may be an account of a player whose quantity of kills is greater than or equal to a threshold of kills, or an account of a player whose quantity of assists is greater than or equal to a threshold of assists) including interaction data (that is, interaction data of a virtual object controlled by an account related to summary information in the information summary dimension during participating an interaction process in the virtual scene, for example, the interaction data may be a quantity of kills, assists, and the like of the virtual object controlled by the account during the interaction process) greater than or equal to the interaction data threshold. Certainly, a most frequently used virtual item in the virtual scene, a most frequently manipulated virtual object in the virtual scene, and the like may also be pushed to the user. In this way, the push of summary information is not fixed and forced, and only when a specific condition is satisfied, the pushing is performed, so that a degree of fragmented display of summary information can be controlled, the order of the information summary interface can be maintained, and requirements of the user can be flexibly satisfied.

As an example, the foregoing degree of similarity between the summary information and the feature of the first virtual object may be determined by using the following manners: extracting a keyword of the summary information, and finding embedding vector representation of the keyword from a pre-trained embedding vector table. If there are a plurality of keywords, an average of embedding vector representation of the plurality of keywords is calculated to be used as the embedding vector representation of the summary information. In the same way, embedding vector representation of the feature of the first virtual object may be determined, and the cosine between the embedding vector representation of the summary information and the embedding vector representation of the feature of the first virtual object is used as the degree of similarity.

In some embodiments, the client may alternatively implement operation 305 by using the following manner: performing one of the following processes for each of the at least one of the tab controls: displaying an information pushing control associated with the tab control at a position connected to the tab control in the information summary interface (for example, a special effect manner of the information pushing control popping up from the tab control is used to display the information pushing control associated with the tab control); displaying, based on a display parameter (such as color and a size) used in the tab control, an information pushing control associated with the tab control at any position of the information summary interface, the information pushing control using a same display parameter as the tab control to represent that an association relationship exists between the information pushing control and the tab control (for example, assuming that a display parameter used in the tab control 1 is yellow, the display parameter used in the information pushing control associated with the tab control 1 is also yellow, thereby representing that the yellow information pushing control is the information pushing control associated with the tab control 1); or displaying an information pushing control associated with the tab control at any position of the information summary interface, a connection line existing between the tab control and the information pushing control to represent that an association relationship exists between the tab control and the information pushing control.

Figure 5A:
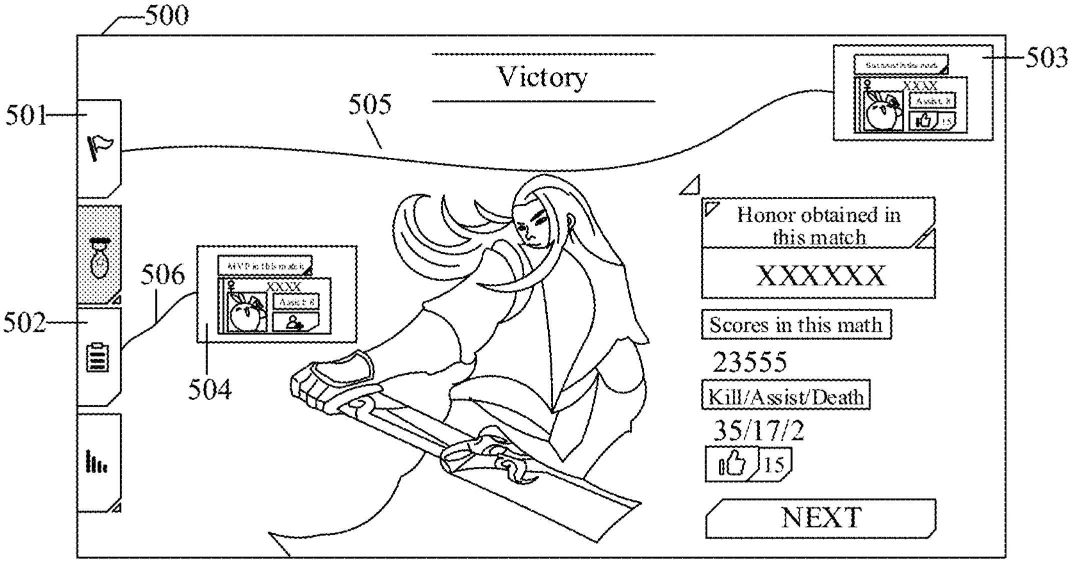
FIG. 5A to FIG. 5C are schematic diagrams of an application scenario of a virtual scene information processing method according to an embodiment of this application.

For example, FIG. 5A is a schematic diagram of an application scenario of a virtual scene information processing method according to an embodiment of this application. As shown in FIG. 5A, a plurality of tab controls, for example, including a tab control 501 and a tab control 502, are displayed in an information summary interface 500 corresponding to the first virtual object. In this case, an information pushing control 503 and an information pushing control 504 are also displayed in the information summary interface 500. The tab control 501 and the information pushing control 503 are connected through a connection line 505, representing that an association relationship exists between the tab control 501 and the information pushing control 503. The tab control 502 and the information pushing control 504 are connected through a connection line 506, representing that an association relationship exists between the tab control 502 and the information pushing control 504.

In some embodiments, a quantity of presentation positions included in the information pushing control may be correspondingly increased or decreased depending on an amount of to-be-displayed summary information (for example, when the amount of to-be-displayed summary information is 3, three presentation positions may be displayed in the information pushing control, and are configured to display three pieces of summary information respectively. When the amount of to-be-displayed summary information is 1, only one presentation position may be displayed in the information pushing control). In addition, for this situation, the user can manually close the summary information, or display of the summary information is canceled automatically when display duration of the summary information is greater than or equal to a display duration threshold. Certainly, the quantity of presentation positions included in the information pushing control is alternatively fixed (for example, there is always only one presentation position), and the at least one piece of to-be-displayed summary information is displayed at the presentation position of the information pushing control in a first-in first-out order.

Figure 5B:
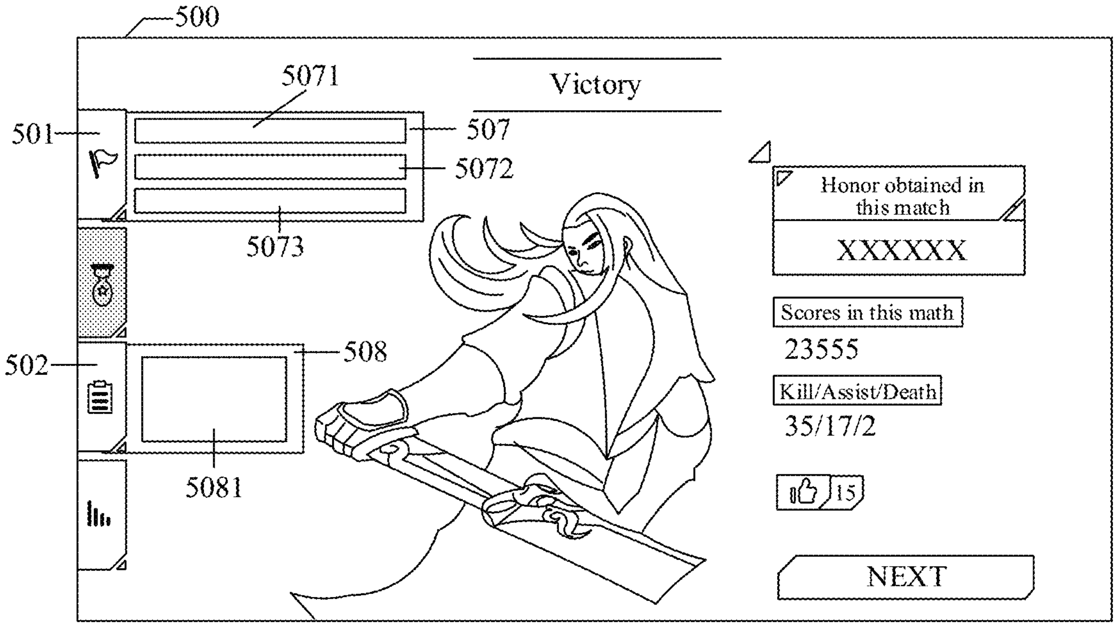

For example, FIG. 5B is a schematic diagram of an application scenario of a virtual scene information processing method according to an embodiment of this application. As shown in FIG. 5B, a plurality of tab controls, for example, including a tab control 501 and a tab control 502, are displayed in an information summary interface 500 corresponding to the first virtual object. Furthermore, an information pushing control 507 associated with the tab control 501 is displayed at a position (such as the right side of the tab control 501) in the information summary interface 500 connected to the tab control 501, and an information pushing control 508 associated with the tab control 502 is displayed at a position (such as the right side of the tab control 502) in the information summary interface 500 connected to the tab control 502. In addition, assuming that an amount of to-be-presented summary information in an information summary dimension corresponding to the tab control 501 is 3, three presentation positions may be displayed in the information pushing control 507, including a presentation position 5071, a presentation position 5072, and a presentation position 5073, and are configured to display the three pieces of summary information respectively. In addition, assuming that an amount of to-be-displayed summary information in an information summary dimension corresponding to a tab control 502 is 1, only one presentation position, such as a presentation position 5081, may be displayed in the information pushing control 508, and is configured to display the piece of summary information. In this way, different quantities of to-be-displayed summary information can be flexibly displayed in the information pushing control.

Figure 4B:
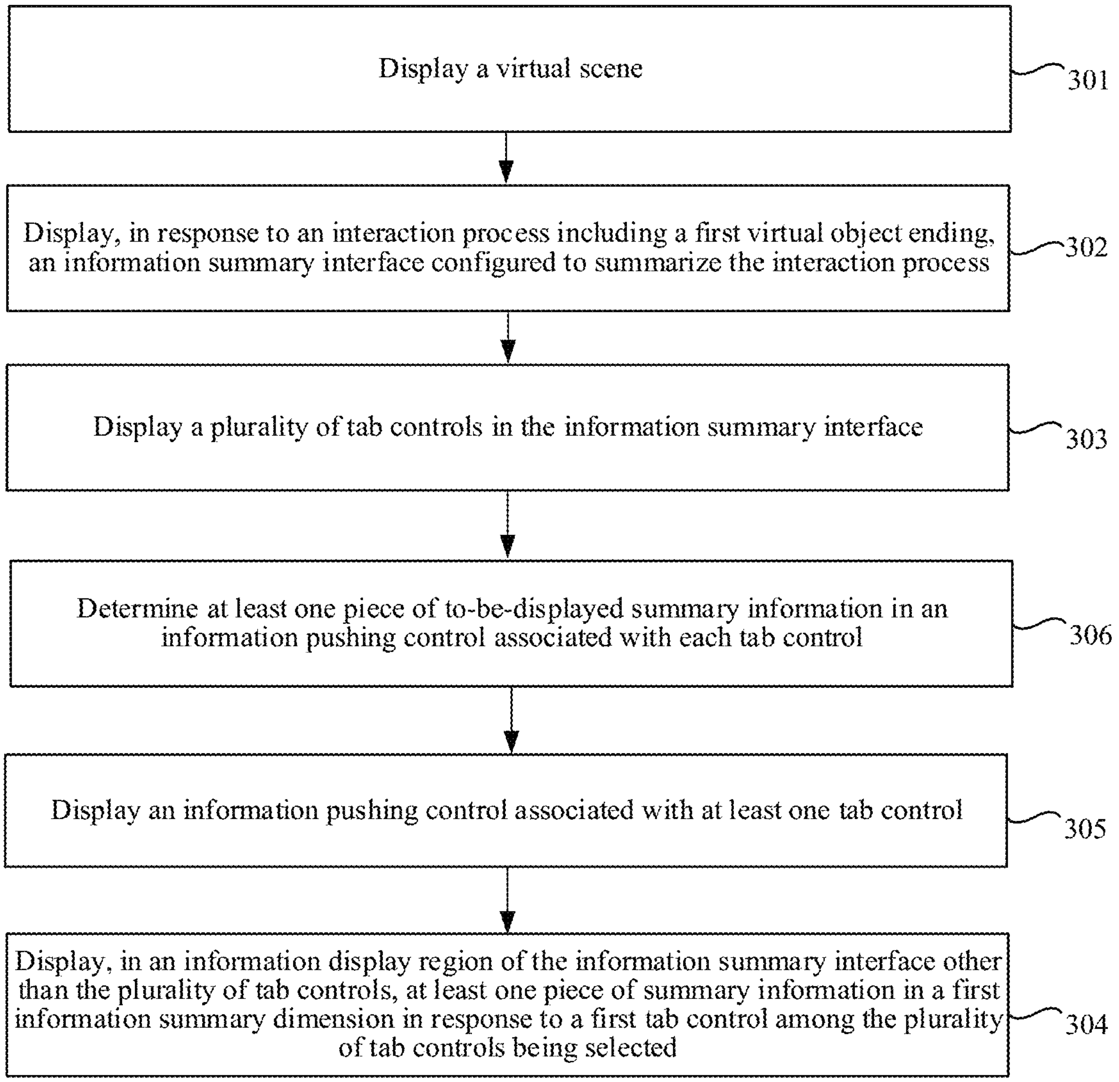

In some embodiments, FIG. 4B is a schematic flowchart of a virtual scene information processing method according to an embodiment of this application. As shown in FIG. 4B, before the client performs operation 305 shown in FIG. 4A, operation 306 shown in FIG. 4B is alternatively performed. A description is carried out with reference to operations shown in FIG. 4B.

Operation 306: Determine at least one piece of to-be-displayed summary information in an information pushing control associated with each tab control.

In some embodiments, the client may implement operation 306 by using the following manner: determining, for each tab control, summary information satisfying one of the following conditions as at least one piece of to-be-displayed summary information in the information pushing control associated with the tab control: at least one piece of summary information selected randomly in the information summary dimension corresponding to the tab control; at least one piece of newly generated summary information in the information summary dimension corresponding to the tab control; or at least one piece of summary information of which the similarity parameter is greater than or equal to the similarity threshold in the information summary dimension corresponding to the tab control, the at least one piece of summary information of which the similarity parameter is greater than or equal to the similarity threshold being determined by the following manners: calling, based on each piece of summary information in the information summary dimension corresponding to the tab control and a feature of a first account logged in to the information summary interface, a machine learning model to perform prediction to obtain a click/tap probability corresponding to the piece of summary information; and sorting a plurality of pieces of summary information in descending order based on the click/tap probability, and determining at least one piece of summary information from a top range of a descending order result as the at least one piece of summary information of which the similarity parameter is greater than or equal to the similarity threshold (for example, taking a tab control 1 as an example, it is assumed that there are five pieces of summary information in an information summary dimension corresponding to the tab control 1, namely summary information 1 to summary information 5, it is also assumed that after the machine learning model is called to perform prediction, a click/tap probability corresponding to the summary information 1 is 80%, a click/tap probability corresponding to the summary information 2 is 70%, a click/tap probability corresponding to the summary information 3 is 85%, a click/tap probability corresponding to the summary information 4 is 90%, and a click/tap probability corresponding to the summary information 5 is 87%; then a sorting result obtained by sorting the five pieces of summary information in descending order based on the click/tap probability is: the summary information 4, the summary information 5, the summary information 3, the summary information 1, the summary information 2; and it is assumed that the similarity threshold is 88%, the summary information 4 can be used as the to-be-displayed summary information in an information pushing control associated with the tab control 1). The first account is associated with the first virtual object.

In some other embodiments, before calling the machine learning model to perform prediction, the client may further train the machine learning model by using the following manners: obtaining a sample information summary dimension and a sample account; calling, based each piece of sample summary information in the sample information summary dimension and a feature of the sample account, an initialized machine learning model to perform prediction to obtain a predicted click/tap probability of the piece of sample summary information; and performing back propagation based on a difference between the predicted click/tap probability and a marked click/tap probability, and updating parameters of the machine learning model stepwise during a back propagation process.

The machine learning model may be trained by the server. For example, the server may train the machine learning model and transmit a trained machine learning model to the client. In addition, a type of the machine learning model may be a neural network model (for example, a convolutional neural network model, a deep convolutional neural network model, or a fully connected neural network model), a decision tree model, a gradient boosting tree model, a multilayer perceptron, a support vector machine, or the like. The type of the machine learning model is not specifically limited in embodiments of this application.

In addition, embodiments of this application may use various types of loss functions to train the machine learning model, for example, including a regression loss function, a binary classification loss function, a hinge loss function, a multi-classification loss function, a multi-class cross entropy loss, and the like.

In some embodiments, the client may further perform one of the following processes for each piece of summary information displayed in any information pushing control: canceling display of the summary information in the information pushing control in response to receiving a trigger closing operation for the summary information (to be specific, the user can manually close a specific piece of summary information); canceling display of the summary information in the information pushing control in response to display duration of the summary information being greater than or equal to a first display duration threshold (for example 1 minute); or canceling, in response to a tab control corresponding to the summary information being selected, display of the summary information in an information pushing control associated with the tab control. Certainly, display of the information pushing control associated with the tab control may alternatively be directly canceled and summary information corresponding to another tab control may be continued to be displayed. For example, assuming that the tab control 1 is currently selected, display of an information pushing control associated with the tab control 1 may be canceled in the information summary interface.

In some other embodiments, when displaying the information pushing control associated with at least one tab control, the client may further perform one of the following processes: displaying, in the summary information and for at least one piece of summary information displayed in an information pushing control associated with the selected tab control (that is, a first target tab control), at least one interaction control corresponding to the summary information (in other words, the interaction control may only be displayed in the summary information displayed in the information pushing control associated with the currently selected tab control); or displaying, in the summary information and for at least one piece of summary information displayed in an information pushing control associated with the tab control satisfying the push condition (that is, a second target tab control), at least one interaction control corresponding to the summary information. In other words, the interaction control may be displayed in the summary information displayed in the information pushing control associated with each tab control.

For example, the client may display, in the summary information, at least one interaction control corresponding to the summary information by using the following manners: displaying, in the summary information in response to the summary information including a virtual item in the virtual scene, at least one of a purchase control for the virtual item or a view control for the virtual item; displaying, in the summary information in response to the summary information being related to a second account located in the virtual scene, and the second account having no social relationship (such as a friendship) with the first account logged in to the information summary interface, at least one of a friends adding control or a report control for the second account; and displaying, in the summary information in response to the summary information being related to the second account located in the virtual scene, and the second account having a social relationship with the first account logged in to the information summary interface, at least one of a like control or a comment control for the second account.

When there are a plurality of interaction controls displayed in the summary information, a carousel control may be used to switch display of the plurality of interaction controls. To be specific, only one interaction control is displayed at a time. Certainly, the plurality of interaction controls may alternatively be displayed simultaneously in the summary information. This is not specifically limited in embodiments of this application.

In some other embodiments, the client may further perform the following process: blocking, in the summary information in response to the summary information being related to the second account located in the virtual scene, the second account having a social relationship with the first account logged in to the information summary interface, and the second account having completed interaction with the first account, display of an interaction control having completed the interaction. In other words, when the interaction has been completed, the summary information may only be pushed without displaying any interaction controls in the summary information to reduce the user's operational burden.

Summary information being related to the second account located in the virtual scene means that the summary information includes information related to the second account located in the virtual scene. For example, the summary information includes a quantity of kills, assists, and the like of a virtual object controlled by the second account during the interaction process.

In some embodiments, the client may further perform the following process: displaying an interaction result in response to a trigger operation on the interaction control, and canceling display of the summary information when duration of displaying the interaction result is greater than or equal to first set duration.

For example, an example in which an interaction control is the view control for the virtual item is used. After the client receives a click/tap operation of the user on the view control displayed in the summary information, details information of the virtual item is displayed in a pop-up window in the information summary interface. In addition, when duration of displaying the details information of the virtual item is greater than or equal to the first set duration (for example, 10 seconds), display of the summary information is canceled. In this way, by canceling the display of the summary information that the user has operated, it is convenient for the user to view other summary information.

The first set duration may be set uniformly by a backend server, or may be set by the user in the client according to the user's actual usage requirements.

In some embodiments, the client may perform the following process for each tab control in the information summary interface: hiding the tab control in response to the tab control satisfying a hiding condition (for example, the tab control may be shrunk to a line at an edge of the information summary interface). The hiding condition includes at least one of the following: duration of displaying the tab control is greater than or equal to second set duration (for example 2 minutes), and a trigger operation for the tab control is not received (to be specific, the client may automatically hide a tab control that has not been triggered by the user for a long time); or duration of new summary information greater than or equal to third set duration (for example 3 minutes) is not obtained in the information summary dimension corresponding to the tab control.

In some other embodiments, the client may perform the following processes for each tab control displayed in the information summary interface: hiding the tab control in response to receiving a trigger hiding operation for the tab control, displaying an unhidden entry, and performing one of the following processes: displaying the tab control in response to receiving a trigger operation for the unhidden entry, and canceling display of the unhidden entry; or displaying the tab control in response to obtaining, in the information summary dimension corresponding to the tab control, new summary information, and canceling display of the unhidden entry.

Figure 5C:
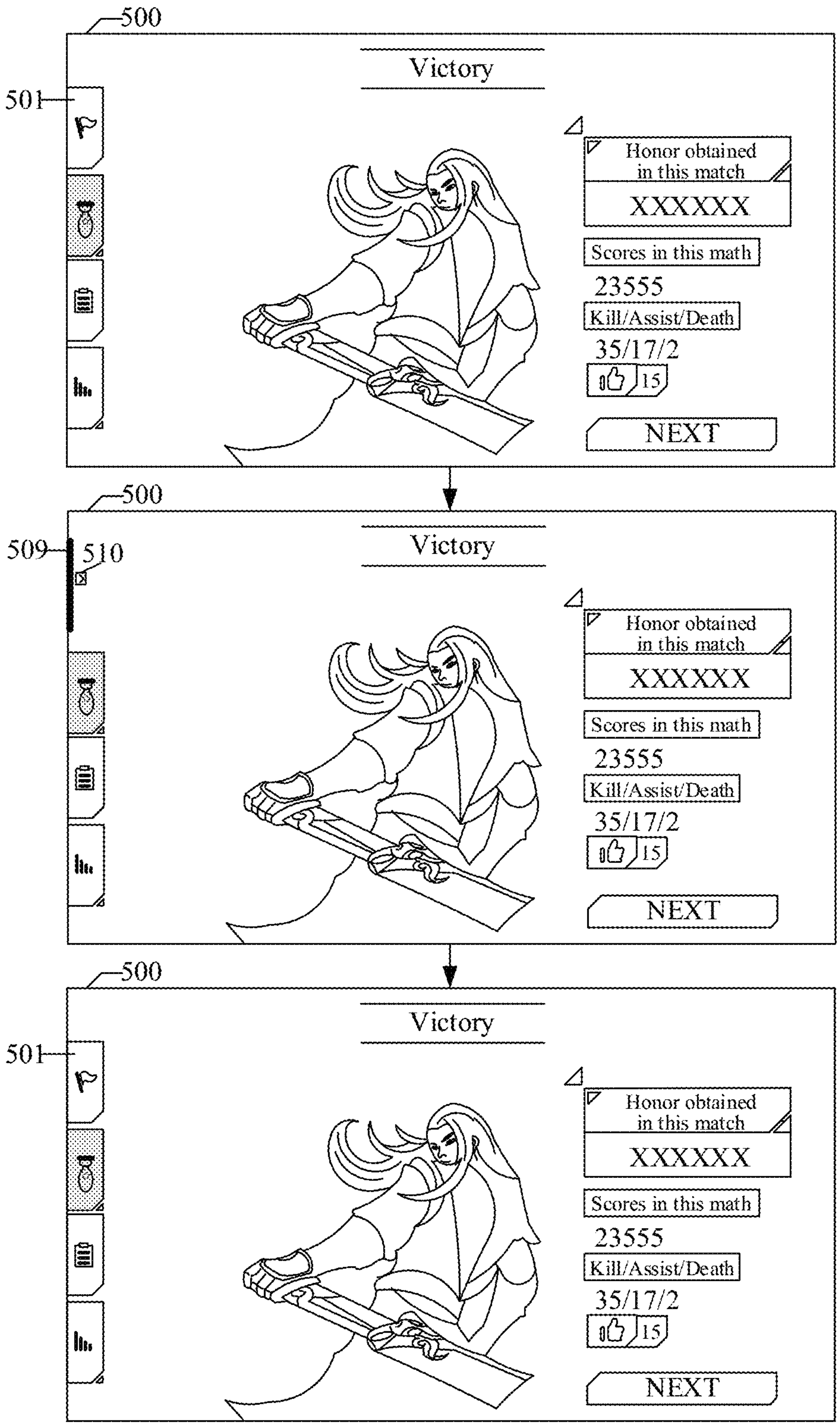

For example, FIG. 5C is a schematic diagram of an application scenario of a virtual scene information processing method according to an embodiment of this application. As shown in FIG. 5C, a plurality of tab controls are displayed in an information summary interface 500 corresponding to the first virtual object. Taking a tab control 501 as an example, when the tab control 501 satisfies the hiding condition, or a user's trigger hiding operation (such as a double-click/tap operation) for the tab control 501 is received, the tab control 501 may be hidden. For example, the tab control 501 may be shrunk into a line segment 509 at the edge of the information summary interface 500, and an unhidden entry 510 is displayed. Then, when the user's trigger operation (such as a click/tap operation) for the unhidden entry 510 is received, or new summary information is obtained in an information summary dimension corresponding to the tab control 501, the tab control 501 is re-displayed in the information summary interface 500, and the display of the unhidden entry 510 is canceled.

Operation 304: Display, in an information display region of the information summary interface other than the plurality of tab controls, at least one piece of summary information in a first information summary dimension in response to a selection of a first tab control among the plurality of tab controls.

The first tab control may be selected by default herein. For example, when an interaction process in which the first virtual object participates in the virtual scene ends, the information summary interface corresponding to the first virtual object is displayed by default. Certainly, the first tab control may alternatively be selected in response to a trigger operation. The first information summary dimension is an information summary dimension corresponding to the first tab control, for example, may be the first virtual object in the virtual scene.

In some other embodiments, a model of the first virtual object may also be displayed in an information summary interface of the client. In this way, the user can intuitively associate a first account logged in to the information summary interface with the first virtual object by observing the model of the first virtual object, so that the information conveying efficiency of conveying the summary information in the virtual scene to the user is further improved.

In the virtual scene information processing method in embodiments of this application, the summary information in the virtual scene is divided into different dimensions, and switching of the summary information in different information summary dimensions is implemented by using the tab control. In this way, a user can trigger a tab control of a corresponding dimension according to requirements to display what the user needs, and resource consumption of information transmission between the electronic device and a backend server is reduced, thereby ensuring stability of the operation of the virtual scene. In addition, the information conveying efficiency of intuitively conveying the summary information in the virtual scene to the user is also effectively improved, and density of information displayed in the information summary interface is also balanced. Therefore, efficiency of the user in obtaining the summary information in the virtual scene is improved, and user experience is improved.

Exemplary application of this embodiment of this application in a practical application scenario is described below.

An embodiment of this application provides a virtual scene information processing method. A multi-operation strong process is converted into a settlement collection page (corresponding to the foregoing information summary interface). The settlement collection page is a hub page in a settlement process, including information related to settlement (for example, may be battle summary information of a player and may jump to another settlement collection page by using a tab or a button). The switching may be implemented in the form of tab control (a tab for short hereinafter). In addition, interactive intelligent push information on the tab is used for implementing the convenient conveying of information. In this way, time cost of a player is reduced without disabling active functions such as achievement display and social interaction.

The virtual scene information processing method in this embodiment of this application is described below in detail.

Figure 6A:
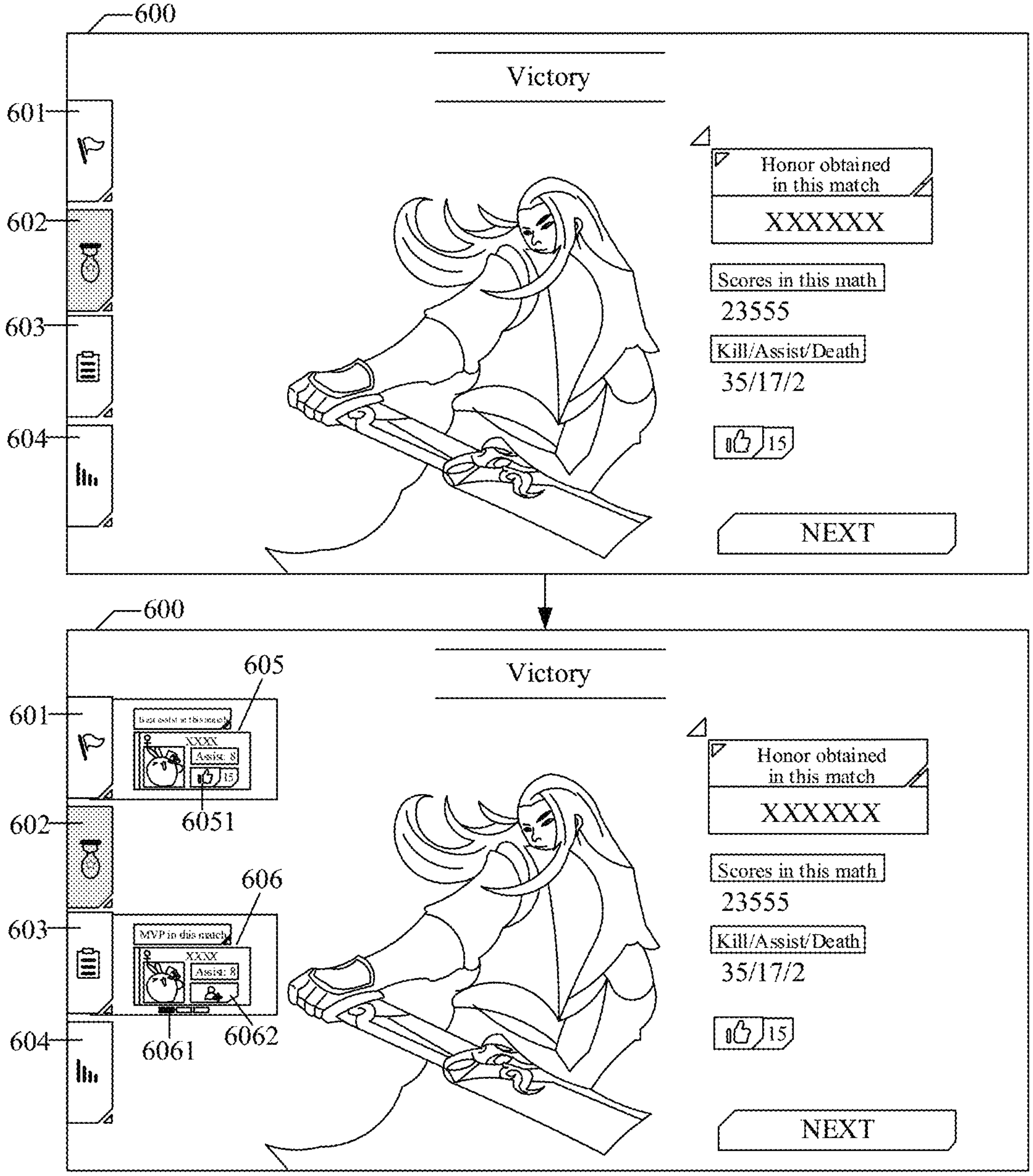
FIG. 6A to FIG. 6C are schematic diagrams of an application scenario of a virtual scene information processing method according to an embodiment of this application.

For example, FIG. 6A is a schematic diagram of an application scenario of a virtual scene information processing method according to an embodiment of this application. After a close-up of a map of the virtual scene is displayed, as shown in FIG. 6A, a settlement collection page 600 may be directly entered. A plurality of tabs, for example, including a tab 601, a tab 602, a tab 603, and a tab 604, are displayed in the settlement collection page 600. A settlement collection page corresponding to the tab 601 may be configured to display battle summary information of players in one's camp. A settlement collection page corresponding to the tab 602 may be configured to display battle summary information of the player. A settlement collection page corresponding to the tab 603 may be configured to display battle summary information of players in the enemy camp in the match. A settlement collection page corresponding to the tab 604 is configured to display a table of battle summary information of all players in the match.

Still refer to FIG. 6A. Because the tab 602 among the plurality of tabs is currently selected, the settlement collection page 600 corresponding to the battle summary information of the player is displayed in a human-computer interaction interface of a client. Information such as a model of a game character controlled by the player, a score in this match, a quantity of kills, a quantity of assists, and death is displayed in the settlement collection page 600. In addition, assuming that there is information that needs to be pushed in settlement collection pages respectively corresponding to the tab 601 and the tab 603, summary information 605 and summary information 606 that need to be pushed may be respectively displayed next to the tab 601 and the tab 603. In addition, assuming that there is no summary information that needs to be pushed in the settlement collection page corresponding to the tab 604, corresponding summary information that needs to be pushed is not displayed next to the tab 604. For the summary information 605 corresponding to the tab 601, a like button 6051 is also displayed in the summary information 605. In this way, the player may directly click/tap the like button for teammates in the settlement collection page 600. For the tab 603, when there are a plurality of pieces of summary information that need to be pushed in the settlement collection page corresponding to the tab 603, a carousel control 6061 may be used to switch and display the plurality of pieces of summary information (where in FIG. 6A, currently displayed summary information 606 and a friends adding button 6062 displayed in the summary information 606 are displayed, so that the player may directly complete an operation of adding other players as friends in the settlement collection page 600, thereby reducing time cost of the player).

Figure 6B:
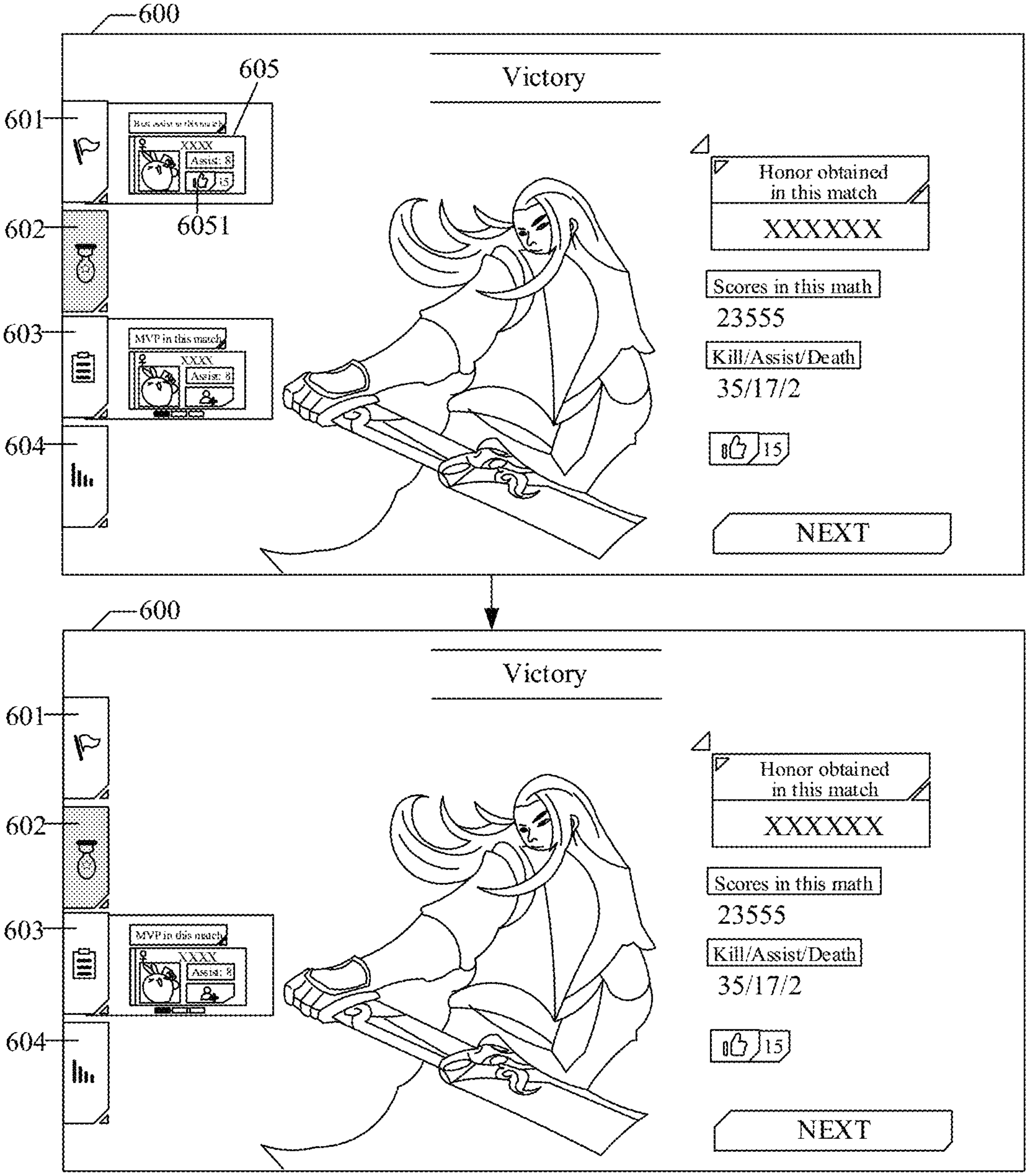

As an example, following the above, FIG. 6B is a schematic diagram of an application scenario of a virtual scene information processing method according to an embodiment of this application. As shown in FIG. 6B, after a click/tap operation on the like button 6051 by the player for the summary information 605 corresponding to the tab 601 is received (in other words, the player has completed the interaction operation), display of the pushed summary information 605 may be canceled in the settlement collection page 600 after set duration (for example, 3 seconds) (in other words, for the completed interaction, corresponding summary information is to disappear after a few seconds).

Figure 6C:
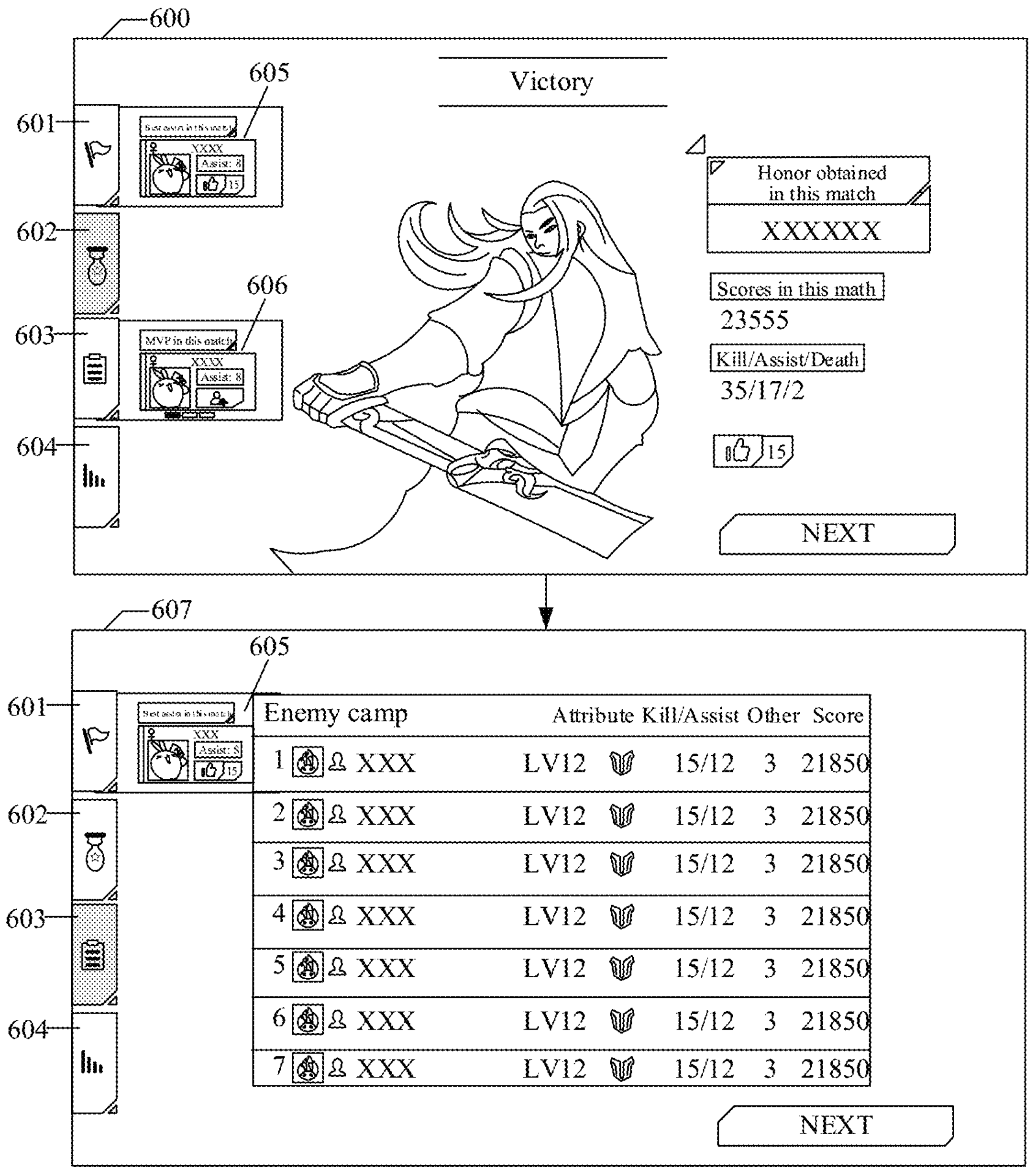

For example, FIG. 6C is a schematic diagram of an application scenario of a virtual scene information processing method according to an embodiment of this application. As shown in FIG. 6C, a plurality of tabs are displayed in a settlement collection page 600 corresponding to a currently selected tab 602 (where the tab 602 may be selected by default). Pushed summary information 605 is displayed next to a tab 601, and pushed summary information 606 is displayed next to a tab 603. Then, when a user selects a tab 603 among the plurality of tabs (to be specific, switching is performed from the tab 602 to the tab 603), the settlement collection page 600 corresponding to the tab 602 displayed in the human-computer interaction interface may be switched to a settlement collection page 607 corresponding to the tab 603, and battle summary information respectively corresponding to a plurality of players of an enemy camp is displayed in the settlement collection page 607. In addition, display of the summary information 606 corresponding to the tab 603 may be canceled in the settlement collection page 607, and the summary information 605 corresponding to the tab 601 is continued to be displayed. In other words, when switching is performed between tabs, push of a target tab disappears, and push of another tab is retained.

The virtual scene information processing method in this embodiment of this application is described below in detail with reference to FIG. 7.

Figure 7:
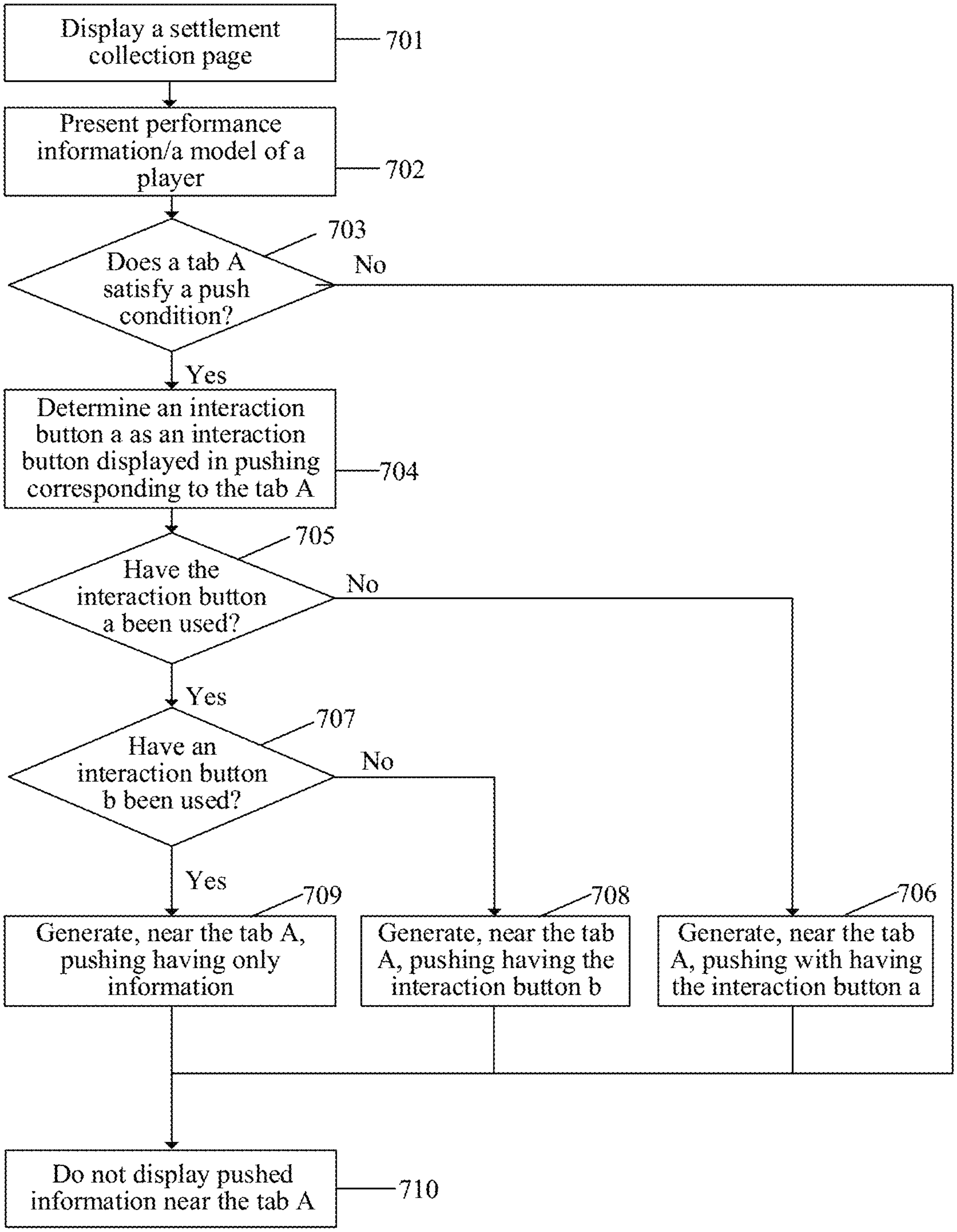
FIG. 7 is a schematic flowchart of a virtual scene information processing method according to an embodiment of this application.

For example, FIG. 7 is a schematic flowchart of a virtual scene information processing method according to an embodiment of this application, which is described with reference to operations shown in FIG. 7.

Operation 701: A client displays a settlement collection page.

Operation 702: The client presents performance information/a model of a player in the settlement collection page.

In some embodiments, when a match in a game ends, the player may directly enter the settlement collection page. Performance information of a game character controlled by the player in this match (such as battle summary information) and a model of the game character controlled by the player are displayed in the settlement collection page.

Operation 703: The client determines whether a tab A satisfies a push condition. If the tab A satisfies the push condition, operation 704 is performed. If the tab A does not satisfy the push condition, operation 710 is performed.

In some embodiments, an example in which the tab A is a team tab (such as the tab 601 shown in FIG. 6A) is used, if the client may determine, based on set logic, for example, after a match is completed, that there is a teammate whose feat satisfies the push condition in the match (for example, a quantity of times enemy is killed is greater than or equal to a kill threshold, a quantity of assists to teammates is greater than or equal to an assist threshold, or a performance score in the match is greater than or equal to a score threshold), the teammate may be pushed in the team tab (for example, an account, interaction record data, and the like of a teammate satisfying the push condition are displayed next to the team tab).

In some other embodiments, an example in which the tab A is a list tab is used. The client may determine, based on performance in the match, whether there is a character whose a quantity of interactions with players is greater than or equal to a times threshold. If yes, the character is pushed in the list tab. For example, the client may also determine whether there is a player whose feat satisfies a set condition. If yes, the player may also be pushed in the list tab.

Operation 704: The client first determines an interaction button a as an interaction button displayed in pushing corresponding to the tab A.

Operation 705: The client determines whether the interaction button a has been used. If the interaction button a has been used, operation 707 is performed. If the interaction button a has not been used, operation 706 is performed.

Operation 706: The client generates, near the tab A, pushing having the interaction button a.

Operation 707: The client continues to determine whether an interaction button b has been used. If the interaction button b has not been used, operation 708 is performed. If the interaction button b has been used, operation 709 is performed.

Operation 708: The client generates, near the tab A, pushing having the interaction button b.

Operation 709: The client generates, near the tab A, pushing having only information.

In some embodiments, an example in which the interaction button a is a like button, and the interaction button b is a friends adding button is used. The client may change, based on a relationship between a current player and another player, an interaction button displayed in pushed summary information. For example, the like button may be displayed in a friend's pushing, and the friends adding button may be displayed in pushing that has been liked. For objects that both the two interactions have been completed, pushing without interaction load may be triggered. To be specific, no interaction buttons are displayed in the pushed information, and only summary information is pushed.

When a plurality of pieces of summary information need to be pushed in the same tab, a carousel control is used to perform switching to display the plurality of pieces of summary information. In addition, an interaction button to be pushed first may also be determined based on a tab type. For example, for the team tab, the friends adding button may be pushed first. For other types of tabs, the like button is pushed first.

Operation 710: The client does not display the pushed information near the tab A.

In some embodiments, when the tab A does not satisfy the push condition, the client may not display the pushed summary information near the tab A. In addition, for a situation in which the tab A satisfies the push condition, when the tab A is selected by the user, the client may cancel, in the settlement collection page, display of summary information associated with the tab A (in other words, pushing of the tab A disappears). Certainly, the player may alternatively manually close the pushed summary information displayed near the tab A. This is not specifically limited in this embodiment of this application.

Furthermore, in addition to settlement, the virtual scene information processing method in embodiments of this application may also be applied to another multi-functional collection interface having tabs. Pushed content may also be flexibly changed. For example, the method may be applied to different scenarios such as a social scenario, an active scenario, and a commercialization scenario (for example, a most frequently used virtual item in a game match may be pushed to players). In addition, for the push condition, generation of pushing can be triggered not only based on in-match performance, a quantity of interactions, and the like, but also be triggered based on behaviors of players (for example, including purchasing, using items, killing game characters controlled by other players, reporting other players, and the like). In addition, the interaction buttons are not necessarily the foregoing like button, friends adding button, and carousel button, and may alternatively be a report button, a personal information view button, an article details view button, or the like. This is not specifically limited in this embodiment of this application.

In conclusion, the virtual scene information processing method in embodiments of this application have the following beneficial effects: (1) No forced process is required: The burden that a player experiences and the interruption of quickly starting the next match are reduced. (2) Key information is highlighted: A player's information is displayed centrally on the settlement collection page, strong feedback and a sense of being noticed are given to players while the beauty of an interface is ensured. (3) Other information is auxiliarily displayed: Information is transmitted or convenient interaction manners are provided to players without interference, or a game designer is enabled to guide a player's cognition and operations without burden. (4) Information is presented with support and logic: Important information in a tab appears next to a corresponding tab in a form of pushing. In this way, confusion is not caused in an interface and players can also be allowed to understand as quickly as possible; (5) A player's operating costs are reduced: Interaction is convenient and there is no need to switch, in other words, even without entering a tab in a split-screen manner, player interaction, positive feedback, and other functions that a game designer wants can be implemented. (6) Pushing is intelligently generated: It is not fixed or forced, and pushing is only generated when a specific condition is satisfied, so that a degree of fragmented display of information is well controlled, the order of an interface is maintained, and the requirements of players can be satisfied flexibly.

The beneficial effects of the virtual scene information processing method in embodiments of this application are further described below by comparing with solutions provided in related art.

In related art, a settlement process is usually displayed in a linear form with many operations. The last page is a settlement collection page. This display manner allows players to see all activity display and commercial display that the game designer wants to convey. However, the process is very complicated, which causes strong burden that a player experiences and interruption of quickly starting the next match.

In addition, related art also provides the following solutions: After simple display (such as MPV close-up and highlight shot replay), the settlement collection page is directly entered, and other information is also collected into tabs/buttons at the corner of the page. This method can set aside a main information display region and shorten the settlement process. However, an information carrying capability of a single page is limited, and a lot of information cannot be conveyed to players. To alleviate the above problem, the solution provided in related art usually collects a large amount of information (for example, including player information, enemy player information, in-match data, in-match configuration, in-match achievements, active interactions, and the like) in the settlement collection page. As a result, overall information is conveyed without focus, and the display effect is poor. Even so, there is still a lot of information that cannot be displayed, for example, including commercial skins, models, and the like.

In addition, related art also provides a common push solution that is not combined with tabs. Push information appears in an empty position that does not conflict with the interface. However, excessively little push information still cannot resolve the problem of that the settlement collection page needs to convey more information. However, when there is excessively much push information, because various push information exists independently without any support, there is no beauty and players have more difficulty understanding information.

For the above technical problems, an embodiment of this application provides a virtual scene information processing method. One's own information is displayed in a settlement collection page, and strong feedback and a sense of being noticed are giving to players. In addition, other information is integrated into a tab in a split-screen manner. However, important information in the tab appears next to a corresponding tab in the form of pushing. In this way, confusion is not caused in the interface, and players can also be allowed to understand as quickly as possible. In addition, the push information is accompanied by an interaction button corresponding to the push information. In this way, even without entering tabs in a split-screen manner, functions such as player interactions and positive feedback that the game designer wants can be implement, so that players' time costs are reduced.

The following continues to describe an exemplary structure that an implementation of the virtual scene summary information processing apparatus 555 provided in this embodiment of this application is a software module. In some embodiments, as shown in FIG. 2, the software module in the virtual scene summary information processing apparatus 555 stored in the memory 550 may include a display module 5551 configured to display a virtual scene, and the virtual scene includes a first virtual object. The display module 5551 is further configured to: display, in response to an interaction process including the first virtual object ending, an information summary interface configured to summarize the interaction process; and display a plurality of tab controls in the information summary interface, each tab control corresponding to one information summary dimension. The display module 5551 is further configured to display, in an information display region of the information summary interface other than the plurality of tab controls, at least one piece of summary information in a first information summary dimension in response to a selection of a first tab control among the plurality of tab controls, the first information summary dimension corresponding to the first tab control.

In some embodiments, the display module 5551 is further configured to display an information pushing control associated with at least one tab control, the information pushing control being configured to display at least one piece of summary information in an associated information summary dimension, the associated information summary dimension being an information summary dimension corresponding to an associated tab control, and the associated tab control being the tab control associated with the information pushing control.

In some embodiments, when a quantity of the tab controls is one, the display module 5551 is further configured to display, in response to a tab control selection operation, an information pushing control associated with a selected tab control.

In some embodiments, the display module 5551 is further configured to display an information pushing control associated with a tab control satisfying a push condition, the push condition including at least one of the following: obtaining, in the information summary dimension corresponding to the tab control, new summary information transmitted by a server; obtaining, in the information summary dimension corresponding to the tab control, summary information of which a similarity parameter is greater than or equal to a similarity threshold, the similarity parameter representing a degree of similarity between the summary information in the information summary dimension and the first virtual object; or obtaining, in the information summary dimension corresponding to the tab control, summary information including interaction data greater than or equal to an interaction data threshold.

In some embodiments, the display module 5551 is further configured to perform one of the following processes for each of the at least one of the tab controls: displaying an information pushing control associated with the tab control at a position connected to the tab control in the information summary interface; displaying, based on a display parameter used in the tab control, an information pushing control associated with the tab control at any position of the information summary interface, the information pushing control using a same display parameter as the tab control; or displaying an information pushing control associated with the tab control at any position of the information summary interface, a connection line existing between the tab control and the information pushing control.

In some embodiments, a quantity of presentation positions included in the information pushing control is correspondingly increased or decreased depending on an amount of summary information. Alternatively, a quantity of presentation positions included in the information pushing control is fixed, and the at least one piece of summary information is displayed at the presentation position of the information pushing control in a first-in first-out order.

In some embodiments, the virtual scene summary information processing apparatus 555 further includes a determining module 5552, configured to determine, before the display module 5551 displays the information pushing control associated with at least one tab control, for the information pushing control associated with each tab control, summary information satisfying one of the following conditions as at least one piece of to-be-displayed summary information in the information pushing control: at least one piece of summary information selected randomly in the information summary dimension corresponding to the tab control; at least one piece of new summary information transmitted by the server in the information summary dimension corresponding to the tab control; or at least one piece of summary information of which the similarity parameter is greater than or equal to the similarity threshold in the information summary dimension corresponding to the tab control, the at least one piece of summary information of which the similarity parameter is greater than or equal to the similarity threshold being determined by the following manners: calling, based on each piece of summary information in the information summary dimension corresponding to the tab control and a feature of a first account logged in to the information summary interface, a machine learning model to perform prediction to obtain a click/tap probability corresponding to the piece of summary information; and sorting a plurality of pieces of summary information in descending order based on the click/tap probability, and determining at least one piece of summary information from a top range of a descending order result as the at least one piece of summary information of which the similarity parameter is greater than or equal to the similarity threshold, the first account being associated with the first virtual object.

In some embodiments, the virtual scene summary information processing apparatus 555 further includes a training module 5553 configured to train the machine learning model by using the following manners: obtaining a sample information summary dimension and a sample account; calling, based each piece of sample summary information in the sample information summary dimension and a feature of the sample account, an initialized machine learning model to perform prediction to obtain a predicted click/tap probability of the piece of sample summary information; and performing back propagation based on a difference between the predicted click/tap probability and a marked click/tap probability, and updating parameters of the machine learning model stepwise during a back propagation process.

In some embodiments, the display module 5551 is further configured to perform the following processes for each piece of summary information displayed in any information pushing control: canceling display of the summary information in response to receiving a trigger closing operation for the summary information; canceling display of the summary information in response to display duration of the summary information being greater than or equal to a first display duration threshold; or canceling display of the summary information in response to a tab control corresponding to the summary information being selected, and continuing to display summary information corresponding to another tab control.

In some embodiments, the display module 5551 is further configured to perform one of the following processes: displaying, in the summary information and for at least one piece of summary information displayed in a first target information pushing control, at least one interaction control corresponding to the summary information, the first target information pushing control being the information pushing control associated with the selected tab control; or displaying, in the summary information and for at least one piece of summary information displayed in a second target information pushing control, at least one interaction control corresponding to the summary information, the second target information pushing control being the information pushing control associated with the tab control satisfying the push condition.

In some embodiments, the display module 5551 is further configured to display, in the summary information, at least one of the following controls in response to the summary information including a virtual item in the virtual scene: a purchase control for the virtual item or a view control for the virtual item; displaying, in the summary information, at least one of the following controls in response to the summary information being related to a second account located in the virtual scene, and the second account having no social relationship with the first account logged in to the information summary interface: a friends adding control for the second account or a report control for the second account; and displaying, in the summary information, at least one of the following controls in response to the summary information being related to the second account located in the virtual scene, and the second account having a social relationship with the first account logged in to the information summary interface: a like control for the second account or a comment control for the second account.

In some embodiments, the display module 5551 is further configured to block, in the summary information in response to the summary information being related to the second account located in the virtual scene, the second account having the social relationship with the first account logged in to the information summary interface, and the second account having completed interaction with the first account, display of an interaction control having completed the interaction.

In some embodiments, the display module 5551 is further configured to display an interaction result in response to a trigger operation on the interaction control, and cancel display of the summary information when duration of displaying the interaction result is greater than or equal to first set duration.

In some embodiments, the display module 5551 is further configured to display the plurality of tab controls in the information summary interface in a specific sorting manner, and the sorting manner includes: sorting historical interaction frequencies of information summary dimensions respectively corresponding to the plurality of tab controls in descending order; sorting an amount of information in the information summary dimensions respectively corresponding to the plurality of tab controls in descending order; sorting timeliness parameters of the information summary dimensions respectively corresponding to the plurality of tab controls in descending order; and sorting importance indicators of the information summary dimensions respectively corresponding to the plurality of tab controls in descending order.

In some embodiments, the virtual scene summary information processing apparatus 555 further includes a hiding module 5554 configured to perform the following processes for each tab control: hiding the tab control in response to the tab control satisfying a hiding condition, the hiding condition including at least one of the following: duration of displaying the tab control is greater than or equal to second set duration, and a trigger operation for the tab control is not received; or duration of new summary information transmitted by a server greater than or equal to third set duration is not obtained in the information summary dimension corresponding to the tab control.

In some embodiments, the hiding module 5554 is further configured to hide the tab control in response to receiving a trigger hiding operation for the tab control. The display module 5551 is further configured to display an unhidden entry, and perform one of the following processes: displaying the tab control in response to receiving a trigger operation for the unhidden entry, and canceling display of the unhidden entry; or displaying the tab control in response to obtaining, in the information summary dimension corresponding to the tab control, new summary information transmitted by a server, and canceling display of the unhidden entry.

In some embodiments, the information summary dimension includes a virtual item, a virtual object, a camp in the virtual scene, an account located in the virtual scene.

The descriptions of the apparatus in embodiments of this application are similar to the foregoing descriptions of the method embodiments, and the apparatus embodiment has beneficial effects similar to those of the method embodiments. Therefore, details are not described herein again. Unexplained technical details of the virtual scene summary information processing apparatus provided in embodiments of this application can be understood based on the description of any of the accompanying drawings FIG. 3, FIG. 4A, or FIG. 4B.

An embodiment of this application provides a computer program product or a computer program. The computer program product or the computer program includes computer instructions stored in a computer-readable storage medium. A processor of a computer device reads the computer instructions from the computer-readable storage medium. The processor executes the computer instructions, so that the computer device implements the foregoing virtual scene information processing method in embodiments of this application.

An embodiment of this application provides a computer-readable storage medium having executable instructions stored thereon. When the executable instructions are executed by a processor, the processor is enabled to perform the virtual scene information processing method in embodiments of this application, such as the virtual scene information processing method shown in FIG. 3, FIG. 4A, or FIG. 4B.

In some embodiments, the computer-readable storage medium may be a memory such as an FRAM, a ROM, a PROM, an EPROM, an EEPROM, a flash memory, a magnetic memory, a compact disc, or a CD-ROM; or may be a variety of devices including one of the foregoing memories or any combination.

In some embodiments, the executable instructions may be written in the form of program, software, software module, script, or code in any form of programming language (including compilation or interpretation language, or declarative or procedural language), and the executable instructions may be deployed in any form, including being deployed as an independent program or being deployed as a module, component, subroutine, or other units suitable for use in a computing environment.

As an example, the executable instructions may, but not necessarily, correspond to a file in a file system, and may be stored in a part of the file that stores other programs or data, for example, stored in one or more scripts in a hyper text markup language (HTML) document, stored in a single file dedicated to the program under discussion, or stored in a plurality of collaborative files (for example, a file that stores one or more modules, subroutines, or code parts).

As an example, the executable instructions may be deployed to be executed on a single electronic device, or on a plurality of electronic devices located in a single location, or on a plurality of electronic devices distributed in a plurality of locations and interconnected through a communication network.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely embodiments of this application and are not intended to limit the protection scope of this application. Any modification, equivalent replacement, and improvement made within the spirit and scope of this application fall within the protection scope of this application.

What is claimed is:

1. A virtual scene information processing method performed by an electronic device, the method comprising:

displaying a virtual scene, the virtual scene comprising a first virtual object;

in response to an interaction process comprising the first virtual object ending, displaying an information summary interface configured to summarize the interaction process;

displaying a plurality of tab controls in the information summary interface, each tab control corresponding to one information summary dimension, wherein the plurality of tab controls include a first tab control and a second tab control, the second tab control having an information pushing control associated with and displayed immediately next to the second tab control, the information pushing control being configured to display at least one piece of summary information corresponding to the second tab control, and the first tab control having no associated information pushing control, wherein the display of the information pushing control associated with the second tab control comprises:

obtaining, in the information summary dimension corresponding to the second tab control, summary information of which a similarity parameter is greater than or equal to a similarity threshold, the similarity parameter representing a degree of similarity between the summary information in the information summary dimension and the first virtual object; and, displaying the information pushing control comprising the obtained summary information of which a similarity parameter is greater than or equal to a similarity threshold; and in response to a selection of the first tab control among the plurality of tab controls, displaying at least one piece of summary information corresponding to the first tab control in an information display region of the information summary interface other than the plurality of tab controls.

2. The method according to claim 1, wherein the display of the information pushing control associated with the second tab control further comprises:

obtaining, in the information summary dimension corresponding to the second tab control, new summary information pushed by a server; or obtaining, in the information summary dimension corresponding to the second tab control, summary information comprising interaction data greater than or equal to an interaction data threshold.

3. The method according to claim 1, wherein the displaying an display of the information pushing control associated with at least one the second tab control comprises:

performing one of the following processes for each of the at least one of the tab controls:

displaying the information pushing control associated with the second tab control at a position connected to the tab control in the information summary interface;

displaying, based on a display parameter used in the tab control, the information pushing control associated with the second tab control at any position of the information summary interface, the information pushing control using a same display parameter as the tab control; or displaying the information pushing control associated with the second tab control at any position of the information summary interface, a connection line existing between the tab control and the information pushing control.

4. The method according to claim 1, wherein a quantity of presentation positions comprised in the information pushing control is correspondingly increased or decreased depending on an amount of summary information; or a quantity of presentation positions comprised in the information pushing control is fixed, and the at least one piece of summary information is displayed at the presentation position of the information pushing control in a first-in first-out order.

5. The method according to claim 1, before the displaying an information pushing control associated with at least one tab control, the method further comprising:

determining, for the information pushing control associated with each tab control, the summary information satisfying one of the following conditions as at least one piece of summary information in the information pushing control:

wherein the at least one piece of summary information corresponding to the second tab control satisfies one of the following conditions:

at least one piece of summary information selected randomly in the information summary dimension corresponding to the tab control;

at least one piece of new summary information transmitted by the server in the information summary dimension corresponding to the tab control; or at least one piece of summary information of which the similarity parameter is greater than or equal to the similarity threshold in the information summary dimension corresponding to the tab control, the at least one piece of summary information of which the similarity parameter is greater than or equal to the similarity threshold being determined by the following manners:

calling, based on each piece of summary information in the information summary dimension corresponding to the tab control and a feature of a first account logged in to the information summary interface, a machine learning model to perform prediction to obtain a click/tap probability corresponding to the piece of summary information; and sorting a plurality of pieces of summary information in descending order based on the click/tap probability, and determining at least one piece of summary information from the top of a descending order result as the at least one piece of summary information of which the similarity parameter is greater than or equal to the similarity threshold, the first account being associated with the first virtual object.

6. The method according to claim 1, when before the displaying an display of the information pushing control associated with at least one the second tab control, the method further comprising:

performing one of the following processes:

displaying, in the summary information and for at least one piece of summary information displayed in a first target information pushing control, at least one interaction control corresponding to the summary information, the first target information pushing control being the information pushing control associated with the selected tab control; or displaying, in the summary information and for at least one piece of summary information displayed in a second target information pushing control, at least one interaction control corresponding to the summary information, the second target information pushing control being the information pushing control associated with the tab control satisfying the push condition.

7. The method according to claim 1, wherein the displaying a plurality of tab controls in the information summary interface comprises:

displaying the plurality of tab controls in the information summary interface in a specific sorting manner, the sorting manner comprising at least one of the following:

sorting historical interaction frequencies respectively corresponding to the plurality of tab controls in descending order;

sorting an amount of information in the information summary dimensions respectively corresponding to the plurality of tab controls in descending order;

sorting timeliness parameters of the information summary dimensions respectively corresponding to the plurality of tab controls in descending order; or sorting importance indicators of the information summary dimensions respectively corresponding to the plurality of tab controls in descending order.

8. An electronic device, comprising:

a memory, configured to store executable instructions; and a processor, configured to implement, when executing the executable instructions stored in the memory, a virtual scene information processing method including:

displaying a virtual scene, the virtual scene comprising a first virtual object;

in response to an interaction process comprising the first virtual object ending, displaying an information summary interface configured to summarize the interaction process;

displaying a plurality of tab controls in the information summary interface, each tab control corresponding to one information summary dimension, wherein the plurality of tab controls include a first tab control and a second tab control, the second tab control having an information pushing control associated with and displayed immediately next to the second tab control, the information pushing control being configured to display at least one piece of summary information corresponding to the second tab control, and the first tab control having no associated information pushing control, wherein the display of the information pushing control associated with the second tab control comprises:

obtaining, in the information summary dimension corresponding to the second tab control, summary information of which a similarity parameter is greater than or equal to a similarity threshold, the similarity parameter representing a degree of similarity between the summary information in the information summary dimension and the first virtual object; and, displaying the information pushing control comprising the obtained summary information of which a similarity parameter is greater than or equal to a similarity threshold; and in response to a selection of the first tab control among the plurality of tab controls, displaying at least one piece of summary information corresponding to the first tab control in an information display region of the information summary interface other than the plurality of tab controls.

9. The electronic device according to claim 8, wherein the display of the information pushing control associated with the second tab control further comprises:

obtaining, in the information summary dimension corresponding to the second tab control, new summary information pushed by a server; or obtaining, in the information summary dimension corresponding to the second tab control, summary information comprising interaction data greater than or equal to an interaction data threshold.

10. The electronic device according to claim 8, wherein the display of the information pushing control associated with the second tab control comprises:

displaying the information pushing control associated with the second tab control at a position connected to the tab control in the information summary interface;

displaying, based on a display parameter used in the tab control, the information pushing control associated with the second tab control at any position of the information summary interface, the information pushing control using a same display parameter as the tab control; or displaying the information pushing control associated with the second tab control at any position of the information summary interface, a connection line existing between the tab control and the information pushing control.

11. The electronic device according to claim 8, wherein a quantity of presentation positions comprised in the information pushing control is correspondingly increased or decreased depending on an amount of summary information; or a quantity of presentation positions comprised in the information pushing control is fixed, and the at least one piece of summary information is displayed at the presentation position of the information pushing control in a first-in first-out order.

12. The electronic device according to claim 8, wherein the at least one piece of summary information corresponding to the second tab control satisfies one of the following conditions:

at least one piece of summary information selected randomly in the information summary dimension corresponding to the tab control;

at least one piece of new summary information transmitted by the server in the information summary dimension corresponding to the tab control; or at least one piece of summary information of which the similarity parameter is greater than or equal to the similarity threshold in the information summary dimension corresponding to the tab control, the at least one piece of summary information of which the similarity parameter is greater than or equal to the similarity threshold being determined by the following manners:

calling, based on each piece of summary information in the information summary dimension corresponding to the tab control and a feature of a first account logged in to the information summary interface, a machine learning model to perform prediction to obtain a click/tap probability corresponding to the piece of summary information; and sorting a plurality of pieces of summary information in descending order based on the click/tap probability, and determining at least one piece of summary information from the top of a descending order result as the at least one piece of summary information of which the similarity parameter is greater than or equal to the similarity threshold, the first account being associated with the first virtual object.

13. The electronic device according to claim 8, before the display of the information pushing control associated with the second tab control, the method further comprising:

performing one of the following processes:

displaying, in the summary information and for at least one piece of summary information displayed in a first target information pushing control, at least one interaction control corresponding to the summary information, the first target information pushing control being the information pushing control associated with the selected tab control; or displaying, in the summary information and for at least one piece of summary information displayed in a second target information pushing control, at least one interaction control corresponding to the summary information, the second target information pushing control being the information pushing control associated with the tab control satisfying the push condition.

14. The electronic device according to claim 8, wherein the displaying a plurality of tab controls in the information summary interface comprises:

displaying the plurality of tab controls in the information summary interface in a specific sorting manner, the sorting manner comprising at least one of the following:

sorting historical interaction frequencies respectively corresponding to the plurality of tab controls in descending order;

sorting an amount of information in the information summary dimensions respectively corresponding to the plurality of tab controls in descending order;

sorting timeliness parameters of the information summary dimensions respectively corresponding to the plurality of tab controls in descending order; or sorting importance indicators of the information summary dimensions respectively corresponding to the plurality of tab controls in descending order.

15. A non-transitory computer-readable storage medium, having executable instructions stored thereon, the executable instructions, when executed by a processor of an electronic device, causing the electronic device to implement a virtual scene information processing method including:

displaying a virtual scene, the virtual scene comprising a first virtual object;

in response to an interaction process comprising the first virtual object ending, displaying an information summary interface configured to summarize the interaction process;

displaying a plurality of tab controls in the information summary interface, each tab control corresponding to one information summary dimension, wherein the plurality of tab controls include a first tab control and a second tab control, the second tab control having an information pushing control associated with and displayed immediately next to the second tab control, the information pushing control being configured to display at least one piece of summary information corresponding to the second tab control, and the first tab control having no associated information pushing control, wherein the display of the information pushing control associated with the second tab control comprises:

obtaining, in the information summary dimension corresponding to the second tab control, summary information of which a similarity parameter is greater than or equal to a similarity threshold, the similarity parameter representing a degree of similarity between the summary information in the information summary dimension and the first virtual object; and, displaying the information pushing control comprising the obtained summary information of which a similarity parameter is greater than or equal to a similarity threshold; and in response to a selection of the first tab control among the plurality of tab controls, displaying at least one piece of summary information corresponding to the first tab control in an information display region of the information summary interface other than the plurality of tab controls.

16. The non-transitory computer-readable storage medium according to claim 15, wherein the display of the information pushing control associated with the second tab control comprises:

obtaining, in the information summary dimension corresponding to the second tab control, new summary information pushed by a server; or obtaining, in the information summary dimension corresponding to the second tab control, summary information comprising interaction data greater than or equal to an interaction data threshold.

17. The non-transitory computer-readable storage medium according to claim 15, wherein the display of the information pushing control associated with the second tab control comprises:

displaying the information pushing control associated with the second tab control at a position connected to the tab control in the information summary interface;

displaying, based on a display parameter used in the tab control, the information pushing control associated with the second tab control at any position of the information summary interface, the information pushing control using a same display parameter as the tab control; or displaying the information pushing control associated with the second tab control at any position of the information summary interface, a connection line existing between the tab control and the information pushing control.

18. The non-transitory computer-readable storage medium according to claim 15, wherein a quantity of presentation positions comprised in the information pushing control is correspondingly increased or decreased depending on an amount of summary information; or a quantity of presentation positions comprised in the information pushing control is fixed, and the at least one piece of summary information is displayed at the presentation position of the information pushing control in a first-in first-out order.

19. The non-transitory computer-readable storage medium according to claim 15, wherein the at least one piece of summary information corresponding to the second tab control satisfies one of the following conditions:

at least one piece of summary information selected randomly in the information summary dimension corresponding to the tab control;

at least one piece of new summary information transmitted by the server in the information summary dimension corresponding to the tab control; or at least one piece of summary information of which the similarity parameter is greater than or equal to the similarity threshold in the information summary dimension corresponding to the tab control, the at least one piece of summary information of which the similarity parameter is greater than or equal to the similarity threshold being determined by the following manners:

calling, based on each piece of summary information in the information summary dimension corresponding to the tab control and a feature of a first account logged in to the information summary interface, a machine learning model to perform prediction to obtain a click/tap probability corresponding to the piece of summary information; and sorting a plurality of pieces of summary information in descending order based on the click/tap probability, and determining at least one piece of summary information from the top of a descending order result as the at least one piece of summary information of which the similarity parameter is greater than or equal to the similarity threshold, the first account being associated with the first virtual object.

20. The non-transitory computer-readable storage medium according to claim 15, before the display of the information pushing control associated with the second tab control, the method further comprising:

performing one of the following processes:

displaying, in the summary information and for at least one piece of summary information displayed in a first target information pushing control, at least one interaction control corresponding to the summary information, the first target information pushing control being the information pushing control associated with the selected tab control; or displaying, in the summary information and for at least one piece of summary information displayed in a second target information pushing control, at least one interaction control corresponding to the summary information, the second target information pushing control being the information pushing control associated with the tab control satisfying the push condition.

* * * * *